US012769652B2

(12) United States Patent
Sumiyoshi et al.

(10) Patent No.: US 12,769,652 B2
(45) Date of Patent: Oct. 20, 2026

(54) DECODING DEVICE AND MEMORY SYSTEM

(71) Applicant: Kioxia Corporation, Tokyo (JP)

(72) Inventors: Masato Sumiyoshi, Yokohama (JP); Kohei Oikawa, Yokohama (JP); Sho Kodama, Kamakura (JP); Keiri Nakanishi, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 28 days.

(21) Appl. No.: 19/071,937

(22) Filed: Mar. 6, 2025

(65) Prior Publication Data

US 2026/0037432 A1 Feb. 5, 2026

(30) Foreign Application Priority Data

Jul. 30, 2024 (JP) ................................ 2024-122959

(51) Int. Cl.
*G06F 12/02* (2006.01)

(52) U.S. Cl.
CPC ................................ *G06F 12/0246* (2013.01)

(58) Field of Classification Search
CPC .................................................. G06F 12/0246
See application file for complete search history.

(56) References Cited

U.S. PATENT DOCUMENTS

2010/0011150 A1* 1/2010 Klein .................. G06F 12/0246 711/E12.008
2018/0364917 A1* 12/2018 Ki ........................... G06F 3/068
2019/0044534 A1 2/2019 Kumar et al.
2020/0145020 A1 5/2020 Goyal et al.
2021/0250043 A1 8/2021 Oikawa et al.

FOREIGN PATENT DOCUMENTS

CN 113448891 A * 9/2021 ......... G06F 13/1668
JP 2021-129143 A 9/2021

* cited by examiner

*Primary Examiner* — Christopher D Birkhimer
(74) *Attorney, Agent, or Firm* — Oblon, McClelland, Maier & Neustadt, L.L.P.

(57) ABSTRACT

According to one embodiment, extraction circuitry of a decoding device calculates a first code length of a first symbol and a second code length of a second symbol. The extraction circuitry determines first context information corresponding to a third symbol, and second context information corresponding to a fourth symbol, and stores the first context information and first boundary location information, and the second context information and second boundary location information. The extraction circuitry acquires third context information and third boundary location information corresponding to a fifth symbol following the third symbol, and fourth context information and fourth boundary location information corresponding to a sixth symbol following the fourth symbol.

18 Claims, 13 Drawing Sheets

DECODING DEVICE AND MEMORY SYSTEM

CROSS-REFERENCE TO RELATED APPLICATIONS

This application is based upon and claims the benefit of priority from Japanese Patent Application No. 2024-122959, filed Jul. 30, 2024, the entire contents of which are incorporated herein by reference.

FIELD

Embodiments described herein relate generally to a decoding device and a memory system.

BACKGROUND

A memory system which performs lossless compression on data received from a host and thereby reduces the size of the data has been known. When transmitting data to the host, the memory system decodes compressed data, i.e., decompresses the compressed data and transmits the decoded data to the host.

A decoding device that decodes a large amount of compressed data per unit time can achieve high throughput.

DETAILED DESCRIPTION

Figure 1:
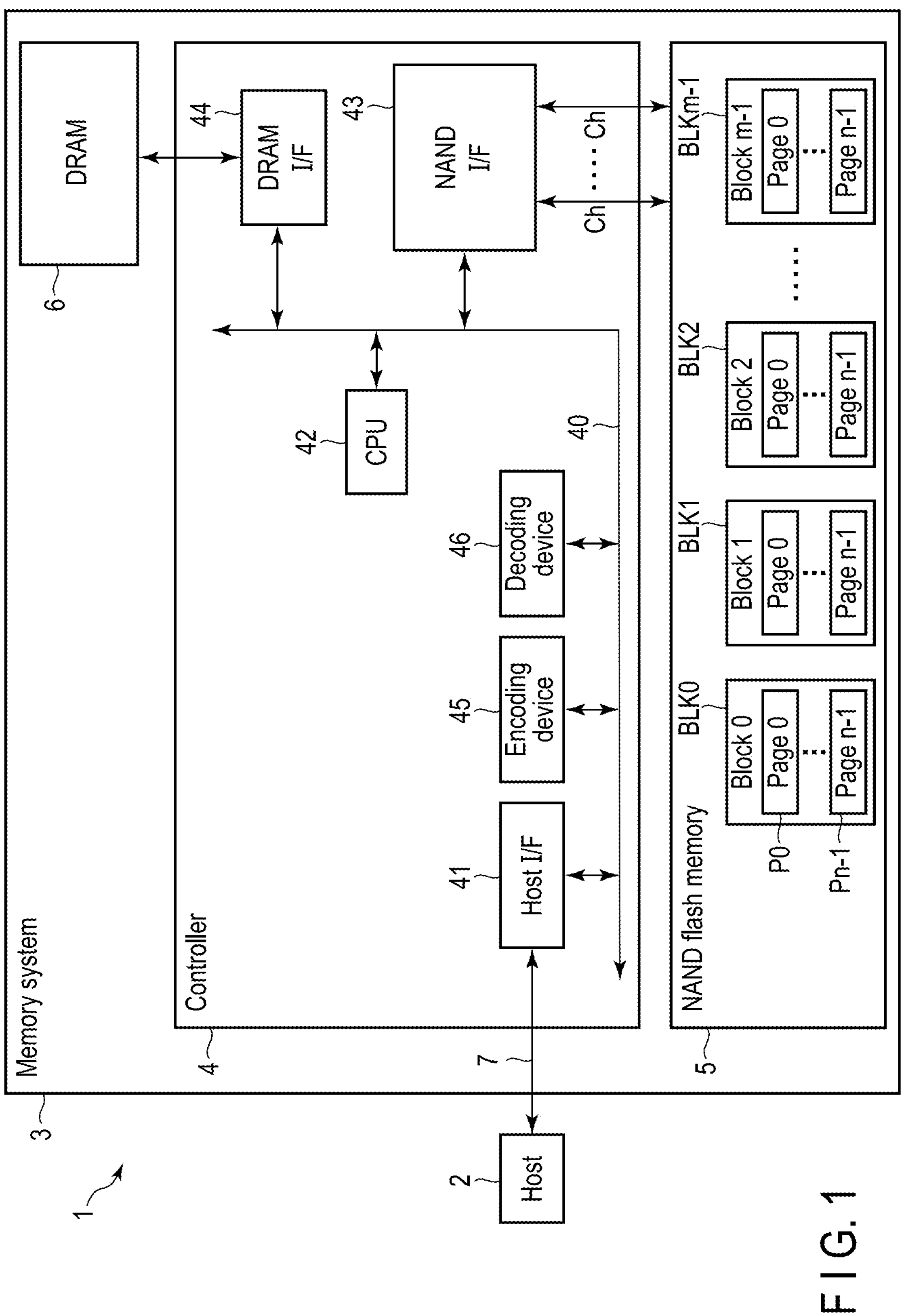
FIG. 1 is a block diagram illustrating a configuration example of an information processing system including a memory system that includes a decoding device according to an embodiment.

In general, according to one embodiment, a decoding device decodes first data being input to the decoding device. The decoding device includes extraction circuitry and decoding circuitry. The extraction circuitry extracts one or more symbols from the first data. The decoding circuitry performs a decoding process on the one or more symbols. The extraction circuitry includes a first code length calculation circuit, a second code length calculation circuit, a first determination circuit, a second determination circuit, a first register, a second register, a first update circuit, a second update circuit, and an output circuit. The first code length calculation circuit calculates first code lengths of respective first symbols, assuming that bits of a first bit string are starting locations of the first symbols, respectively, and that the first symbols are encoded by a first encoding scheme, the bits of the first bit string being included in an extraction range of the first data. The second code length calculation circuit calculates second code lengths of respective second symbols, assuming that the bits of the first bit string are starting locations of the second symbols and that the second symbols are encoded by a second encoding scheme. The first determination circuit determines first context information indicating that each of third symbols is encoded by any one of the first encoding scheme and the second encoding scheme, the third symbols following the first symbols, respectively. The second determination circuit determines second context information indicating that each of fourth symbols is encoded by any one of the first encoding scheme and the second encoding scheme, the fourth symbols following the second symbols, respectively. The first register stores the first context information, and first boundary location information that indicates an initial bit location of each of the third symbols and is determined based on the first code lengths. The second register stores the second context information, and second boundary location information that indicates an initial bit location of each of the fourth symbols and is determined based on the second code lengths. The first update circuit acquires third context information and third boundary location information that correspond to fifth symbols, based on the first context information and the first boundary location information that are stored in the first register, the fifth symbols following the third symbols, respectively, the third boundary location information indicating an initial bit of each of the fifth symbols. The first update circuit stores the third context information and the third boundary location information in the first register. The second update circuit acquires fourth context information and fourth boundary location information that correspond to sixth symbols, based on the second context information and the second boundary location information that are stored in the second register, the sixth symbols following the fourth symbols, respectively, the fourth boundary location information indicating an initial bit of each of the sixth symbols. The second update circuit stores the fourth context information and the fourth boundary location information in the second register. The output circuit extracts one or more symbols from a bit string in the extraction range, based on pieces of context information and pieces of boundary location information that are stored in the first register and the second register. The output circuit outputs the one or more extracted symbols to the decoding circuitry. The decoding circuitry performs the decoding process on each of the one or more extracted symbols.

Various embodiments will be described hereinafter with reference to the accompanying drawings.

FIG. 1 is a block diagram illustrating a configuration example of an information processing system 1 including a memory system 3 that includes a decoding device 46 according to an embodiment. The memory system 3 that includes the decoding device 46 according to the embodiment is, for example, a solid state device (SSD). The memory system 3 may be any one of various types of storage device, such as a hard disk drive (HDD), a universal serial bus (USB) memory, a memory card, and an optical disk device. The memory system 3 is capable of communicating with a host device 2 (host 2).

The information processing system 1 includes the host 2 and the memory system 3. The host 2 and the memory system 3 is connectable via a bus 7.

The host 2 is an information processing device. The host 2 is, for example, a personal computer, a server computer, or a mobile terminal. The host 2 accesses the memory system 3. To be specific, the host 2 transmits a write command, which is a command to write data into a nonvolatile memory, to the memory system 3. The host 2 transmits a read command, which is a command to read data from the nonvolatile memory, to the memory system 3.

The memory system 3 is, for example, a semiconductor storage device that includes a nonvolatile memory and is configured to write data into the nonvolatile memory and read data from the nonvolatile memory. The semiconductor storage device is, for example, an SSD. The nonvolatile memory included in the memory system 3 is, for example, a NAND flash memory 5.

The memory system 3 may be used as a storage of the host 2. The memory system 3 may be provided inside the host 2 or may be connected to the host 2 via a cable or a network.

The memory system 3 and the host 2 communicate with each other via the bus 7. The bus 7 is mainly used for transmitting data and an input/output command (I/O command) from the host 2 to the memory system 3 and transmitting data and a response from the memory system 3 to the host 2. The I/O command is a command to write or read data into or from the nonvolatile memory. The I/O command is, for example, a write command, which is a command to write data into the nonvolatile memory, or a read command, which is a command to read data from the nonvolatile memory.

An interface for connecting the memory system 3 and the host 2 conforms to standards such as SCSI, Serial Attached SCSI (SAS), AT Attachment (ATA), Serial ATA (SATA), PCI Express™ (PCIe™), Ethernet™, Fibre channel, or NVM Express™ (NVMe™).

The internal configuration of the memory system 3 will be described next. The memory system 3 includes a memory controller (controller) 4 and the NAND flash memory 5. The memory system 3 may further include a dynamic random access memory (DRAM) 6.

The controller 4 is a memory controller which controls the NAND flash memory 5 and the DRAM 6. The controller 4 is, for example, control circuitry such as a system-on-a-chip (SoC). The controller 4 is electrically connected to each of the NAND flash memory 5 and the DRAM 6. The controller 4 processes various commands received from the host 2. The controller 4 executes writing of data into the NAND flash memory 5 by processing a write command. The controller 4 executes reading of data from the NAND flash memory 5 by processing a read command. The controller 4 may include a static random access memory (SRAM) or a DRAM. In this case, the DRAM 6, which is provided outside the controller 4, may not be provided.

The controller 4 functions as, for example, a flash translation layer (FTL) configured to execute data management and block management of the NAND flash memory 5. The data management executed by the FTL includes management of mapping information indicative of a relationship between each logical address and each physical address of the NAND flash memory 5. The block management includes management of defective blocks, wear leveling, and garbage collection.

The logical address is an address used by the host 2 for addressing a storage area of the memory system 3. The logical address is, for example, a logical block address (LBA).

The management of the mapping between each logical address and each physical address is executed for example, by using a logical-to-physical address translation table. The controller 4 uses the logical-to-physical address translation table to manage the mapping between each logical address and each physical address with a certain management size. A physical address corresponding to a logical address indicates a physical memory location in the NAND flash memory 5 to which user data of the logical address is written. The logical-to-physical address translation table may be loaded from the NAND flash memory 5 to the DRAM 6 when the memory system 3 is boot up.

The data write operation into one page is executable only once in a single P/E cycle. Thus, the controller 4 writes updated data corresponding to a logical address not to an original physical memory location in which previous data corresponding to the logical address is stored but to a different physical memory location. Then, the controller 4 updates the logical-to-physical address translation table to associate the logical address with this different physical memory location and to invalidate the previous data.

In addition, the controller 4 is connected to the DRAM 6 to be able to communicate with the DRAM 6. The controller 4 executes writing of data into the DRAM 6 and reading of data from the DRAM 6.

The NAND flash memory 5 is a nonvolatile memory. The NAND flash memory 5 is, for example, a flash memory having a three-dimensional structure. The NAND flash memory 5 includes a plurality of memory cells that are arranged in a matrix. The NAND flash memory 5 includes blocks BLK0 to BLKm−1. The blocks BLK0 to BLKm−1 each function as a unit of a data erase operation in which data is erased. The data erase operation is also simply referred to as an erase operation. Each of the blocks BLK0 to BLKm−1 is also referred to as a physical block, a flash block, or a memory block.

Each of the blocks BLK0 to BLKm−1 includes pages (here, pages P0 to Pn−1). Each of the pages includes memory cells that are connected to a single word line. The pages P0 to Pn−1 each function as a unit of a data write operation and a data read operation.

The DRAM 6 is a volatile memory. A part of a storage area of the DRAM 6 is used to, for example, temporarily store information that is used to manage the memory system 3. In addition, another part of the storage area of the DRAM 6 may be used to temporarily store data to be written received from the host 2 or data read from the NAND flash memory 5.

An example of the internal configuration of the controller 4 will be described next. The controller 4 includes a host interface (host I/F) 41, a CPU 42, a NAND interface (NAND I/F) 43, a DRAM interface (DRAM I/F) 44, an encoding device 45, and the decoding device 46. These components are each connected via an internal bus 40.

The host interface 41 is interface circuitry which executes communication with the host 2. The host interface 41, for example, receives an I/O command and data from the host 2. In addition, the host interface 41 transmits data and a response to the host 2.

The CPU 42 is a processor. The CPU 42 controls the host interface 41, the NAND interface 43, the DRAM interface 44, the encoding device 45, and the decoding device 46. The CPU 42 loads a control program (firmware) stored in the NAND flash memory 5 or a ROM (not illustrated in the figure) to the DRAM 6 or a RAM (not illustrated in the figure) of the controller 4. The CPU 42 performs various processes by executing the control program (firmware).

The NAND interface 43 is interface circuitry which executes access to the NAND flash memory 5. When the NAND flash memory 5 includes a plurality of NAND flash memory dies, the NAND interface 43 may be connected to the NAND flash memory dies via multiple channels, respectively. By operating the NAND memory dies in parallel, it is possible to broaden an access bandwidth between the controller 4 and the NAND flash memory 5.

The DRAM interface 44 is interface circuitry which executes access to the DRAM 6. The DRAM interface 44 stores data in the DRAM 6 and reads data stored in the DRAM 6.

The encoding device 45 is a device which compresses data to be written (hereinafter, also referred to as write data) into the NAND flash memory 5. The encoding device 45 compresses, for example, write data that is associated with a write command received from the host 2. The encoding device 45 compresses the write data by using a lossless compression algorithm. Data obtained by compressing write data will be hereinafter referred to as a compressed stream. The lossless compression algorithm is, for example, a combination of dictionary-based encoding and entropy encoding (referred to as Deflate), or the like. The following description assumes a case where Deflate is used as the lossless compression algorithm. The dictionary-based encoding converts previously appearing (occurring) data, of the write data to be compressed into a compressed stream, into a code word (symbol) that refers to the previously appearing data. In addition, the entropy encoding converts the code word so that a code length of a code word is determined based on a frequency of occurrence of each code word (symbol) in the write data.

The size of a compressed stream is smaller than the size of uncompressed write data. The larger the size of write data compressed at once by the encoding device 45 is, the smaller the ratio of the size of the compressed data to the size of the write data is. That is, the larger the size of write data compressed at once is, the more efficiently the encoding device 45 can compress the write data. This is because as the size of write data compressed at once becomes larger, the amount of information that can be referred to in the compression process of the write data increases.

The decoding device 46 is a device which generates uncompressed data by decompressing a compressed stream. The decoding device 46, for example, decompresses a compressed steam that is read from the NAND flash memory 5 on the basis of a read command received from the host 2. For example, the compressed stream is generated with the Deflate format. To perform data decoding on the compressed stream, the decoding device 46 performs a combination of entropy decoding and dictionary-based decoding. The decoding device 46 thereby generates uncompressed data from the compressed stream.

Figure 2:
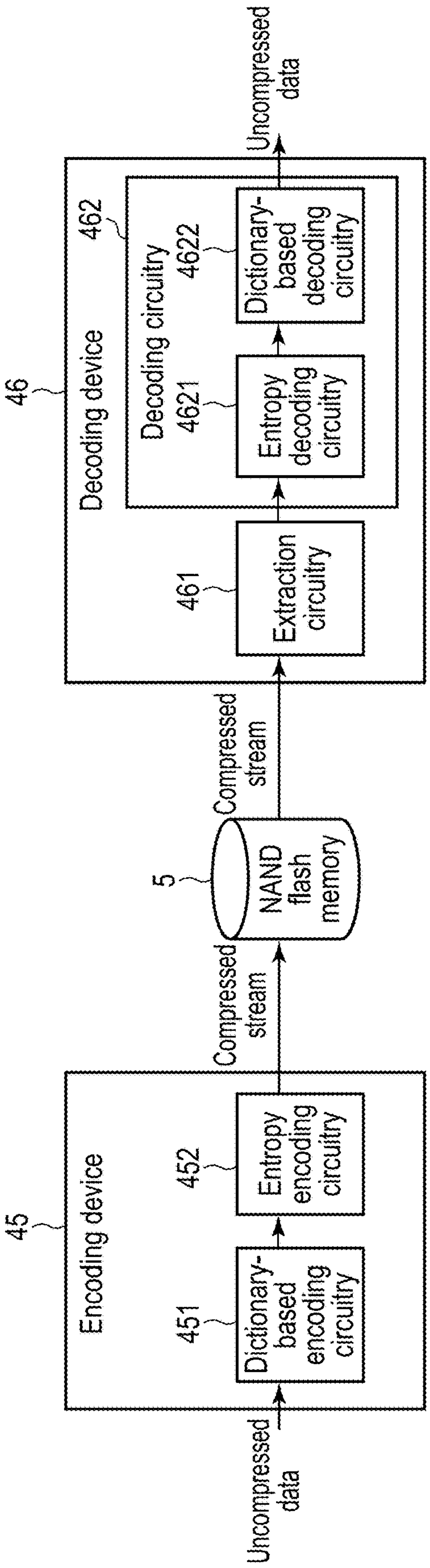
FIG. 2 is a diagram for explaining a data compression process and a data decompression process performed by an encoding device and the decoding device according to the embodiment.

An encoding process and a decoding process will be described next. FIG. 2 is a diagram for explaining the encoding process performed by the encoding device 45 and the decoding process performed by the decoding device 46.

The description here assumes a case where the encoding process performed by the encoding device 45 conforms to Deflate. At this time, the encoding process includes dictionary-based encoding and entropy encoding. The encoding device 45 includes dictionary-based encoding circuitry 451 and entropy encoding circuitry 452.

The dictionary-based encoding circuitry 451 performs dictionary-based encoding on input data (i.e., uncompressed data) input to the encoding device 45.

The dictionary-based encoding is an encoding scheme in which compression target data is converted into a match distance and a match length by using a dictionary buffer that stores previously input data. The dictionary-based encoding is also referred to as dictionary compression. As the dictionary-based encoding, LZ77 or LZSS may be used, for example.

When the dictionary-based encoding circuitry 451 searches the dictionary buffer and there is data that matches compression target data in the dictionary buffer, the dictionary-based encoding circuitry 451 retrieves previously appearing data in the dictionary buffer that at least partly matches the compression target data and acquires its match distance and match length. Then, the dictionary-based encoding circuitry 451 replaces the compression target data with the match distance and the match length, and outputs them as a result of the dictionary-based encoding. The match distance is the distance from the location where the compression target data is to be stored to the location where the retrieved previously appearing data is stored, in the dictionary buffer. The match length is the length of the matching portions between the retrieved previously appearing data and the compression target data. The dictionary-based encoding circuitry 451 can compress the compression target data by converting the data into the match distance and the match length. The data portion generated through this compression is referred to as a match symbol. In addition, in the present embodiment, each of the match length and the match distance included in the match symbol may be handled as one symbol. These symbols may be referred to as a match length symbol and a match distance symbol, respectively.

In contrast, when there is no data that matches the compression target data in the dictionary buffer, the dictionary-based encoding circuitry 451 outputs the compression target data as it is, as a result of the dictionary-based encoding. This data portion is referred as to a literal symbol or a literal.

The entropy encoding circuitry 452 further performs entropy encoding on the input data that has been encoded by the dictionary-based encoding.

In the entropy encoding, a code length is changed in accordance with a frequency of occurrence, with respect to the input data. That is, the entropy encoding circuitry 452 uses the difference between the frequencies of occurrence of data portions in the input data in order to assign codes of different code lengths to the data portions, respectively. The entropy encoding circuitry 452 assigns a code having a short code length to a data portion with a high frequency of occurrence, assigns a code having a long code length to a data portion with a low frequency of occurrence, and thereby can reduce the data amount of codes as a whole.

The entropy encoding circuitry 452 uses, for example, Huffman coding as the entropy encoding. When using Huffman coding, the entropy encoding circuitry 452 may perform static Huffman coding or dynamic Huffman coding. The static Huffman coding is an encoding scheme that uses a coding tree constructed in advance. The dynamic Huffman coding is an encoding scheme that uses a coding tree changed according to target data of Huffman coding. In addition, arithmetic encoding or the like may be used as the entropy encoding, for example.

In the encoding process performed by the encoding device 45 as described above, the dictionary-based encoding circuitry 451 first performs dictionary-based encoding on input uncompressed data. Then, the entropy encoding circuitry 452 performs entropy encoding on the result of the dictionary-based encoding. The encoding device 45 thereby generates a compressed stream. The generated compressed data is, for example, written into the NAND flash memory 5.

The decoding device 46 performs, on data read from the NAND flash memory 5, an extraction process, an entropy decoding process, and a dictionary-based decoding process. The decoding device 46 includes extraction circuitry 461 and decoding circuitry 462.

The extraction circuitry 461 is circuitry which extracts one or more symbols from a compressed stream. The extraction circuitry 461 selects a bit string corresponding to an extraction range from a compressed stream read from the NAND flash memory 5. The extraction circuitry 461 acquires boundary location information of each of one or more symbols that are included in the selected bit string. The boundary location information is information indicative of a starting bit location of each of the symbols in the selected bit string. The extraction circuitry 461 outputs the bit string corresponding to the extraction range, for which the starting bit locations have been identified based on the acquired boundary location information, to the decoding circuitry 462.

The decoding circuitry 462 performs the entropy decoding process and the dictionary-based decoding process on each of one or more symbols extracted by the extraction circuitry 461. The decoding circuitry 462 includes entropy decoding circuitry 4621 and dictionary-based decoding circuitry 4622.

The entropy decoding circuitry 4621 and the dictionary-based decoding circuitry 4622 are implemented as, for example, at least one of a register, a memory, an adder, a comparator, a selector, and other operating circuits. The register is implemented as, for example, a sequential circuit such as a flip-flop. The memory is implemented as, for example, a memory element such as an SRAM or a DRAM. The adder, the comparator, the selector, and the other operating circuits are implemented as, for example, a combinational logical circuit.

The entropy decoding circuitry 4621 performs an entropy decoding process on input data (i.e., an extracted bit string). In the entropy decoding process, a data portion included in the compressed stream is decompressed, based on information used in the entropy encoding process. The entropy decoding circuitry 4621 transmits the result of the entropy decoding to the dictionary-based decoding circuitry 4622.

The dictionary-based decoding circuitry 4622 performs dictionary-based decoding on the input data on which the entropy decoding has been performed. The dictionary-based decoding circuitry 4622 converts a match length symbol and a match distance symbol in the input data into uncompressed data. The dictionary-based decoding circuitry 4622 thereby outputs uncompressed data. In the dictionary-based decoding, a match symbol includes a match length and a match distance that are acquired by replacement based on a previously appearing data portion. Therefore, when decoding a target match symbol, conventional dictionary-based decoding circuitry cannot determine the starting location of the target match symbol unless at least an immediately preceding match symbol is decoded. For this reason, it has been necessary to sequentially decode symbols one by one. In contrast, the dictionary-based decoding circuitry 4622 of the present embodiment can determine the starting location of each symbol, based on the boundary location information of each symbol in the input data output by the extraction circuitry 461. Thus, the dictionary-based decoding circuitry 4622 does not need to sequentially decode symbols one by one.

In the decoding process performed by the decoding device 46 as described above, the extraction circuitry 461 first outputs a bit string including one or more symbols from a compressed stream. Then, the entropy decoding circuitry 4621 performs entropy decoding on each of the one or more symbols included in the output bit string. The dictionary-based decoding circuitry 4622 performs dictionary-based decoding on the result of entropy decoding. The decoding device 46 thereby generates uncompressed data.

Figure 3:
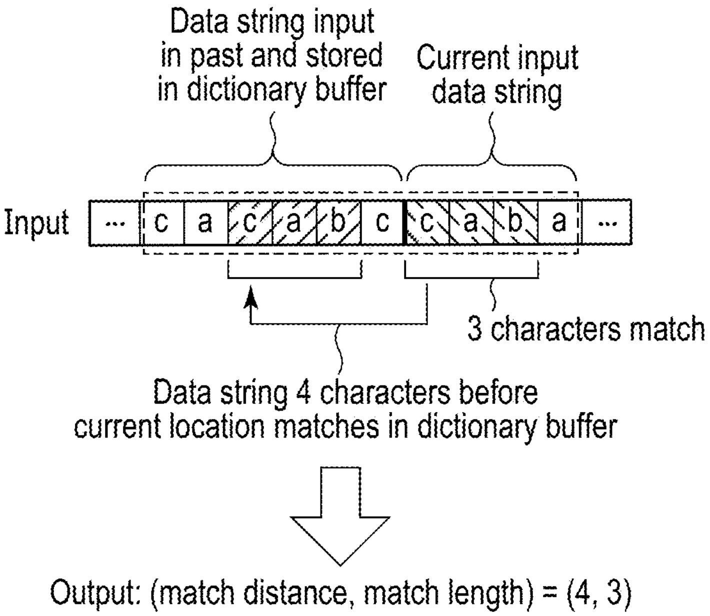
FIG. 3 is a diagram illustrating an example of dictionary-based encoding in the memory system that includes the decoding device according to the embodiment.

A specific example of dictionary-based encoding will be described next. FIG. 3 is a diagram illustrating the example of dictionary-based encoding. In the example illustrated in FIG. 3, a previously input data string "... cacabc" is stored in the dictionary buffer. In addition, a current input data string is "caba".

In this case, the two characters from the head of the current input data string "caba" match a data string "ca" that is stored six locations before the location where the current input data string "caba" is stored, in the dictionary buffer. In addition, the three characters from the head of the current input data string "caba" match a data string "cab" that is stored four locations before the location where the current input data string "caba" is stored, in the dictionary buffer.

In dictionary-based encoding, the current input data string "caba" is converted into a match distance and a match length that relatively refer to a data string that matches the current input data string "caba" longer in the dictionary buffer.

Therefore, the current input data string "caba" is converted into a match distance "4" and a match length "3" that relatively refer to the data string "cab" in the dictionary buffer. The match distance "4" indicates a relative distance from the location where the current input data string "caba" is to be stored to the location where the data string "cab" is stored in the dictionary buffer. The match length "3" indicates the length of a matching portion between the current input data string "caba" and the data string "cab". Accordingly, in a case where dictionary-based encoding is performed on the current input data string "caba", the dictionary-based encoding circuitry 451 outputs, for example, (4, 3) that indicates a combination of the match distance and the match length.

Figure 4:
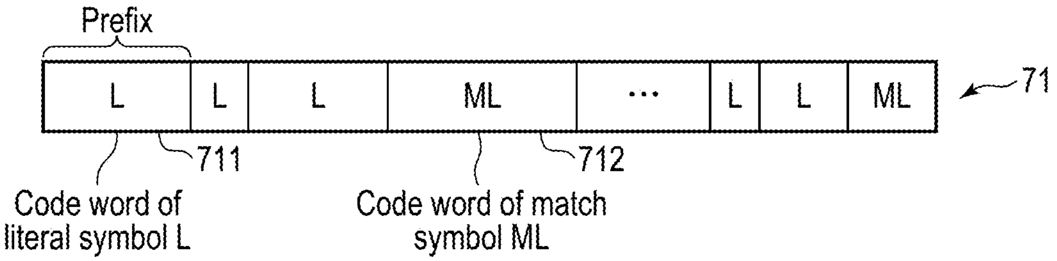
FIG. 4 is a diagram illustrating an example of a compressed stream in the memory system that includes the decoding device according to the embodiment.

A compressed stream on which dictionary-based encoding has been performed will be described next. FIG. 4 is a diagram illustrating an example of a compressed stream.

A compressed stream 71 includes symbols. The symbols include a literal symbol 711 and a match symbol 712.

The literal symbol 711 is a symbol that does not match any data string stored in the dictionary buffer. The literal symbol may be referred to as a dictionary mismatch symbol. The literal symbol 711 includes a prefix. The prefix is a variable-length code.

Figure 5:
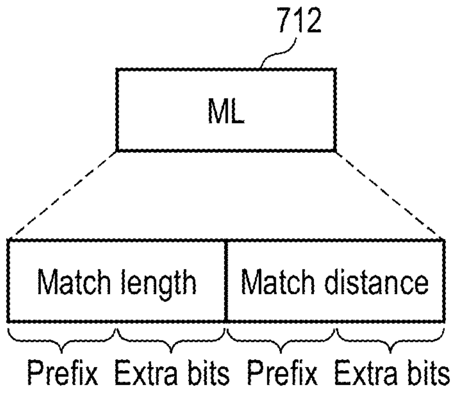
FIG. 5 is a diagram illustrating an example of a match symbol in the memory system that includes the decoding device according to the embodiment.

The match symbol 712 is a symbol that indicates a matched data string stored in the dictionary buffer. The match symbol may be referred to as a dictionary match symbol. A configuration example of the match symbol 712 will be described with reference to FIG. 5. FIG. 5 is a diagram illustrating the configuration example of the match symbol 712. The match symbol 712 includes a match length symbol and a match distance symbol.

The match length symbol is a symbol corresponding to a match length. The match length symbol includes a prefix and extra bits.

The match distance symbol is a symbol corresponding to a match distance. The match distance symbol includes a prefix and extra bits.

The method of calculating a code length varies according to the type of a corresponding symbol. More specifically, the code length of a literal symbol is the length of its prefix. The code length of each of a match length symbol and a match distance symbol is acquired by calculating the sum of the length of its prefix and the length of its extra bits.

The length of a prefix will be described here.

Figure 6:
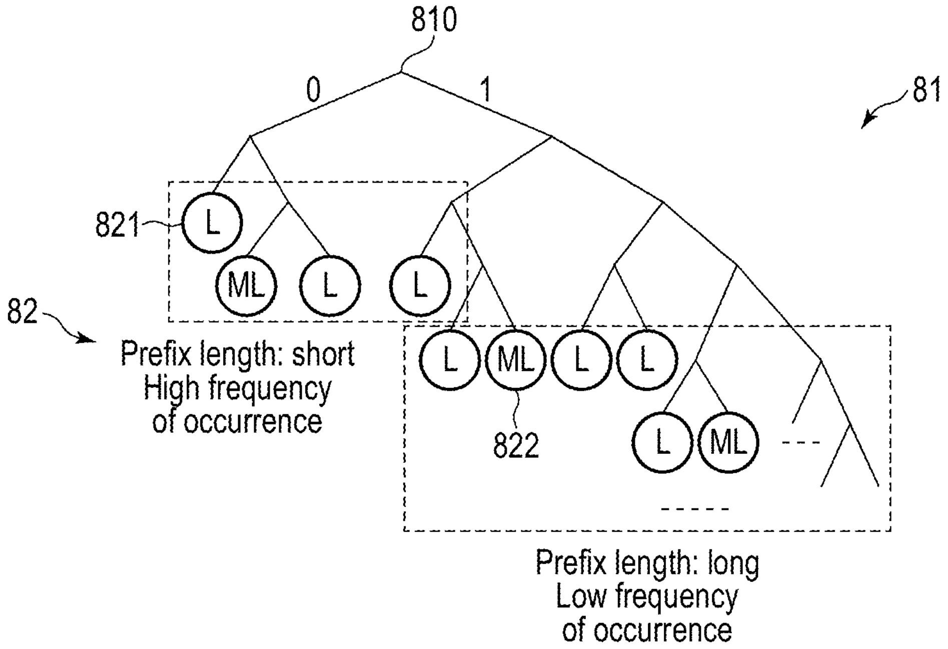
FIG. 6 is a diagram illustrating a Huffman tree used in entropy encoding in the memory system that includes the decoding device according to the embodiment.

FIG. 6 illustrates an example of a Huffman tree 81 that represents a prefix assigned to a literal symbol and a prefix assigned to a match length symbol. The prefix assigned to a literal symbol and the prefix assigned to a match length symbol are represented by the common Huffman tree 81. In FIG. 6, the Huffman tree 81 represents the prefixes of a literal symbol and a match length symbol, whereas a Huffman tree also represents a prefix of a match distance symbol. A case where the prefix of a match length symbol is used will be described here with reference to FIG. 6.

Each leaf node 82 of the Huffman tree 81 corresponds to any one symbol among the literal symbols and the match length symbols that occur in the compressed stream 71. The depth of each leaf node 82 from a root node 810 of the Huffman tree 81 (i.e., the number of edges from the root node 810 to each leaf node 82) is equivalent to the length of the prefix assigned to the corresponding symbol.

To create the Huffman tree 81, first, a new node is created by combining, among the leaf nodes 82, two leaf nodes 82 with the smallest numbers. The number corresponding to the created node is the sum of the numbers of the combined two leaf nodes 82.

Then, a new node is created by combining, among the other leaf nodes 82 and the created node, two leaf nodes 82 with the smallest numbers or one leaf node 82 and the created node with the smallest numbers. The number corresponding to the new created node is the sum of the numbers corresponding to either the combined leaf nodes 82 or the combined leaf node 82 and created node.

This process is repeated to create the root node 810, which is a starting point, and the Huffman tree 81 is thereby complete. At each node of the Huffman tree 81, "0" and "1" are assigned to its edges, respectively. At the root node 810 of FIG. 6, "0" is assigned to the left edge, and "1" is assigned to the right edge. Such assignment gives a bit string uniquely representing each leaf node 82.

For example, a leaf node 821 corresponds to a literal symbol. To the literal symbol corresponding to the leaf node 821, a prefix "00" is assigned. The length of this prefix is two.

In addition, for example, a leaf node 822 corresponds to a match length symbol. To the match length symbol corresponding to the leaf node 822, a prefix "1011" is assigned. The length of this prefix is four.

In this manner, the prefixes are variable-length codes acquired by the entropy encoding. Accordingly, as the number increases, that is, as the frequency of occurrence of a symbol increases, the length of the corresponding prefix becomes shorter. In contrast, as the number decreases, that is, as the frequency of occurrence of a symbol decreases, the length of the corresponding prefix becomes longer.

The extra bits are a code that may be included in a match symbol. To be specific, the extra bits are a code that may be added to a prefix included in a symbol corresponding to a match length or a symbol corresponding to a match distance. The length of extra bits is determined on the basis of the type of a corresponding match symbol.

Figure 7:
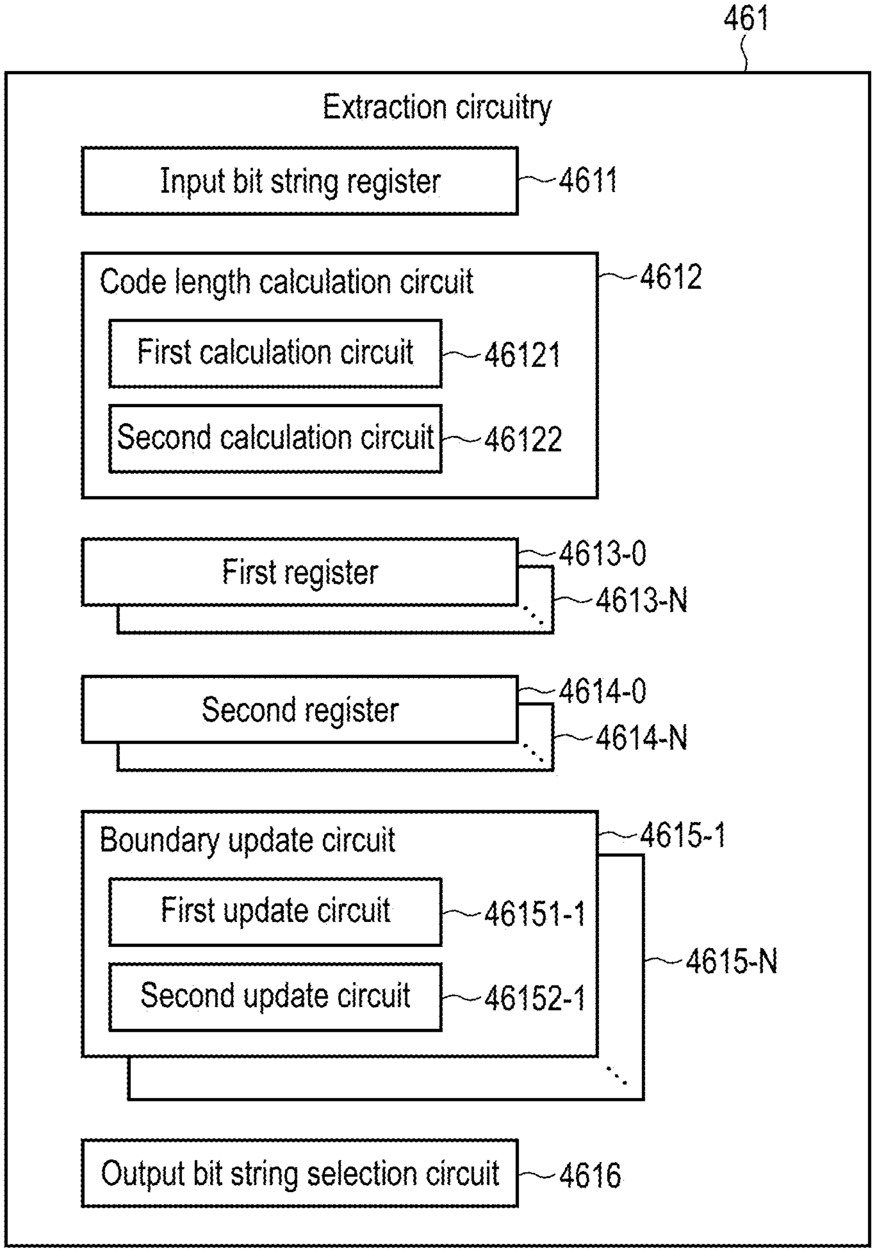
FIG. 7 is a block diagram illustrating a configuration example of extraction circuitry included in the decoding device according to the embodiment.

A configuration example of the extraction circuitry 461 will be described next. FIG. 7 is a block diagram illustrating the configuration example of the extraction circuitry 461 included in the decoding device 46 according to the embodiment.

The extraction circuitry 461 includes an input bit string register 4611, a code length calculation circuit 4612, first registers 4613-0 . . . 4613-N, second registers 4614-0 . . . 4614-N, boundary update circuits 4615-1 . . . 4615-N, and an output bit string selection circuit 4616.

The input bit string register 4611, the code length calculation circuit 4612, the first registers 4613-0 . . . 4613-N, the second registers 4614-0 . . . 4614-N, the boundary update circuits 4615-1 . . . 4615-N, and the output bit string selection circuit 4616 are implemented as, for example, at least one of a register, an adder, a comparator, a selector, and other operating circuits. The register is implemented as, for example, a sequential circuit such as a flip-flop. The adder, the comparator, the selector, and the other operating circuits are implemented as, for example, a combinational logical circuit.

The input bit string register 4611 is a register including memory locations. Each of the memory locations stores one-bit data. The memory locations of the input bit string register 4611 store a bit string of an extraction range among a compressed stream to be decoded input to the extraction circuitry 461. The extraction range is the size of a bit string extracted by the extraction circuitry 461. The number of memory locations included in the input bit string register 4611 corresponds to the number of bits included in the extraction range.

The code length calculation circuit 4612 is a circuit which calculates code lengths of one or more symbols included in the extraction range. The code length calculation circuit 4612 calculates a code length of each symbol, assuming that each bit of the bit string stored in the input bit string register 4611 is a starting location. Specifically, the code length calculation circuit 4612 calculates a first code length, assuming that each symbol is encoded by a first encoding scheme, and calculates a second code length, assuming that each symbol is encoded by a second encoding scheme.

The code length calculation circuit 4612 includes a first calculation circuit 46121 and a second calculation circuit 46122.

The first calculation circuit 46121 calculates code lengths, assuming that symbols whose starting locations are respective bits of the bit string are encoded by the first encoding scheme. The first encoding scheme is an encoding scheme by which a literal symbol or a match length symbol is encoded. Then, the first calculation circuit 46121 generates boundary location information indicative of a starting location of a symbol that follows each of the symbols, based on each of the calculated code lengths. Moreover, when generating the boundary location information, the first calculation circuit 46121 determines whether a corresponding symbol (target symbol) of the symbols is a literal symbol or a match length symbol. When the target symbol is a literal symbol, the first calculation circuit 46121 stores, in the first register 4613-0, context information indicating that a symbol following the target symbol is a symbol encoded by the first encoding scheme, and the generated boundary location information. In addition, when the target symbol is a match length symbol, the first calculation circuit 46121 stores, in the first register 4613-0, context information indicating that a symbol following the target symbol is a symbol encoded by the second encoding scheme, and the generated boundary location information. This is because a symbol following a literal symbol is either a literal symbol or a match length symbol, and a symbol following a match length symbol is a match distance symbol.

The second calculation circuit 46122 calculates code lengths, assuming that symbols whose starting locations are respective bits of the bit string are encoded by the second encoding scheme. The second encoding scheme is an encoding scheme by which a match distance symbol is encoded. Then, the second calculation circuit 46122 generates boundary location information indicative of a starting location of a symbol that follows each of the symbols, based on each of the calculated code lengths. The second calculation circuit 46122 stores, in the second register 4614-0, context information indicating that a symbol following each of the symbols is a symbol encoded by the first encoding scheme, and the generated boundary location information. This is because a symbol following a match distance symbol is predicted to be one of a literal symbol and a match length symbol, both of which are encoded by the first encoding scheme.

The first registers 4613-0 . . . 4613-N are registers each including storage locations that store boundary location information and context information based on the assumption that symbols whose starting locations are respective bits of an input bit string and the symbols are encoded by the first encoding scheme. The storage locations included in each of the first registers 4613-0 . . . 4613-N correspond to the bits included in the extraction range, respectively. Each of the storage locations of the first register 4613-0 stores boundary location information indicative of a starting location of a symbol that follows a symbol whose starting location is assumed to be each bit of the input bit string and context information corresponding to the following symbol, which are calculated by the first calculation circuit 46121. Each of the storage locations of the first register 4613-1 stores boundary location information indicative of a starting location of a symbol that is two symbols after the symbol whose starting location is assumed to be each bit of the input bit string and context information corresponding to the symbol two symbols after, which are acquired by a first update circuit 46151-1, which will be described later. Each of the storage locations of the first register 4613-2 stores boundary location information indicative of a starting location of a symbol that is four symbols after the symbol whose starting location is assumed to be each bit of the input bit string and context information corresponding to the symbol four symbols after, which are acquired by a first update circuit 46151-2, which will be described later. Each of the storage locations of the first register 4613-N stores boundary location information indicative of a starting location of a symbol that is $2^N$ symbols after the symbol whose starting location is assumed to be each bit of the input bit string and context information corresponding to the symbol $2^N$ symbols after, which are acquired by a first update circuit 46151-N, which will be described later. Here, N corresponds to the number of times the updating of boundary location information is repeated. For example, N is an integer greater than or equal to one.

The second registers 4614-0 . . . 4614-N are registers each including storage locations that store boundary location information and context information based on the assumption that symbols whose starting locations are respective bits of the input bit string and the symbols are encoded by the second encoding scheme. The storage locations included in each of the second registers 4614-0 . . . 4614-N correspond to the bits included in the extraction range, respectively. Each of the storage locations of the second register 4614-0 stores boundary location information indicative of a starting location of a symbol that follows a symbol whose starting location is assumed to be each bit of the input bit string and context information corresponding to the following symbol, which are calculated by the second calculation circuit 46122. Each of the storage locations of the second register 4614-1 stores boundary location information indicative of a starting location of a symbol that is two symbols after the symbol whose starting location is assumed to be each bit of the input bit string and context information corresponding to the symbol two symbols after, which are calculated by a second update circuit 46152-1, which will be described later. Each of the storage locations of the second register 4614-2 stores boundary location information indicative of a starting location of a symbol that is four symbols after the symbol whose starting location is assumed to be each bit of the input bit string and context information corresponding to the symbol four symbols after, which are calculated by a second update circuit 46152-2, which will be described later. Each of the storage locations of the second register 4614-N stores boundary location information indicative of a starting location of a symbol that is $2^N$ symbols after the symbol whose starting location is assumed to be each bit of the input bit string and context information corresponding to the symbol $2^N$ symbols after, which are calculated by a second update circuit 46152-N, which will be described later.

The boundary update circuits 4615-1 . . . 4615-N are circuits which acquire boundary location information and context information of a further following symbol, based on boundary location information and context information that correspond to each bit of the input bit string. The boundary update circuits 4615-1 . . . 4615-N include first update circuits 46151-1 . . . 46151-N, respectively, and include second update circuits 46152-1 . . . 46152-N, respectively.

The first update circuits 46151-1 . . . 46151-N acquire boundary location information and context information that are stored in a storage location in the first registers 4613-0 . . . 4613-(N−1) or the second registers 4614-0 . . . 4614-(N−1) that is identified by boundary location information and context information stored in each storage location of the first registers 4613-0 . . . 4613-(N−1). In addition, the first update circuits 46151-1 . . . 46151-N store the acquired boundary location information and context information in the first registers 4613-1 . . . 4613-N.

To be specific, the first update circuit 46151-1 identifies boundary location information and context information to be stored in the first register 4613-1, based on original boundary location information and original context information that are stored in the first register 4613-0. When the original context information indicates the first encoding scheme, the first update circuit 46151-1 acquires new boundary location information and context information from a storage location of the first register 4613-0 that is indicated by the original boundary location information. The first update circuit 46151-1 stores the acquired new boundary location information and context information in the first register 4613-1. In contrast, when the original context information indicates the second encoding scheme, the first update circuit 46151-1 acquires boundary location information and context information from a storage location of the second register 4614-0 that is indicated by the original boundary location information. The first update circuit 46151-1 stores the acquired boundary location information and context information in the first register 4613-1.

The second update circuits 46152-1 . . . 46152-N acquire boundary location information and context information that area stored in a storage location of the first registers 4613-0 . . . 4613-(N−1) or the second registers 4614-0 . . . 4614-(N−1) that is identified by boundary location information and context information stored each storage location of the second registers 4614-0 . . . 4614-(N−1). In addition, the second update circuits 46152-1 . . . 46152-N store the acquired boundary location information and context information in the second registers 4614-1 . . . 4614-N.

To be specific, the second update circuit 46152-1 identifies boundary location information and pieces of context information to be stored in the second register 4614-1, based on original boundary location information and original context information that are stored in the second register 4614-0. When the original context information indicates the first encoding scheme, the second update circuit 46152-1 acquires new boundary location information and context information from a storage location of the first register 4613-0 that is indicated by the original boundary location information. The second update circuit 46152-1 stores the acquired boundary location information and context information in the second register 4614-1. When the original context information indicates the second encoding scheme, the second update circuit 46152-1 acquires boundary location information and context information from a storage location of the second register 4614-0 that is indicated by the original boundary location information. The second update circuit 46152-1 stores the acquired boundary location information and context information in the second register 4614-1.

The output bit string selection circuit 4616 is a circuit which selects a bit string to be output by the extraction circuitry 461. The output bit string selection circuit 4616 selects the output bit string, based on boundary location information and context information of a symbol that is $2^N$ symbols ahead (i.e., a symbol that is $2^N$ symbols after, in an input order of symbols), which are stored in the first register 4613-N or the second register 4614-N. The output bit string may include at least one or more symbols.

An extraction process in a comparative example will be described, before the description of the extraction process performed by the extraction circuitry 461 of the decoding device 46 according to the embodiment.

Figure 8:
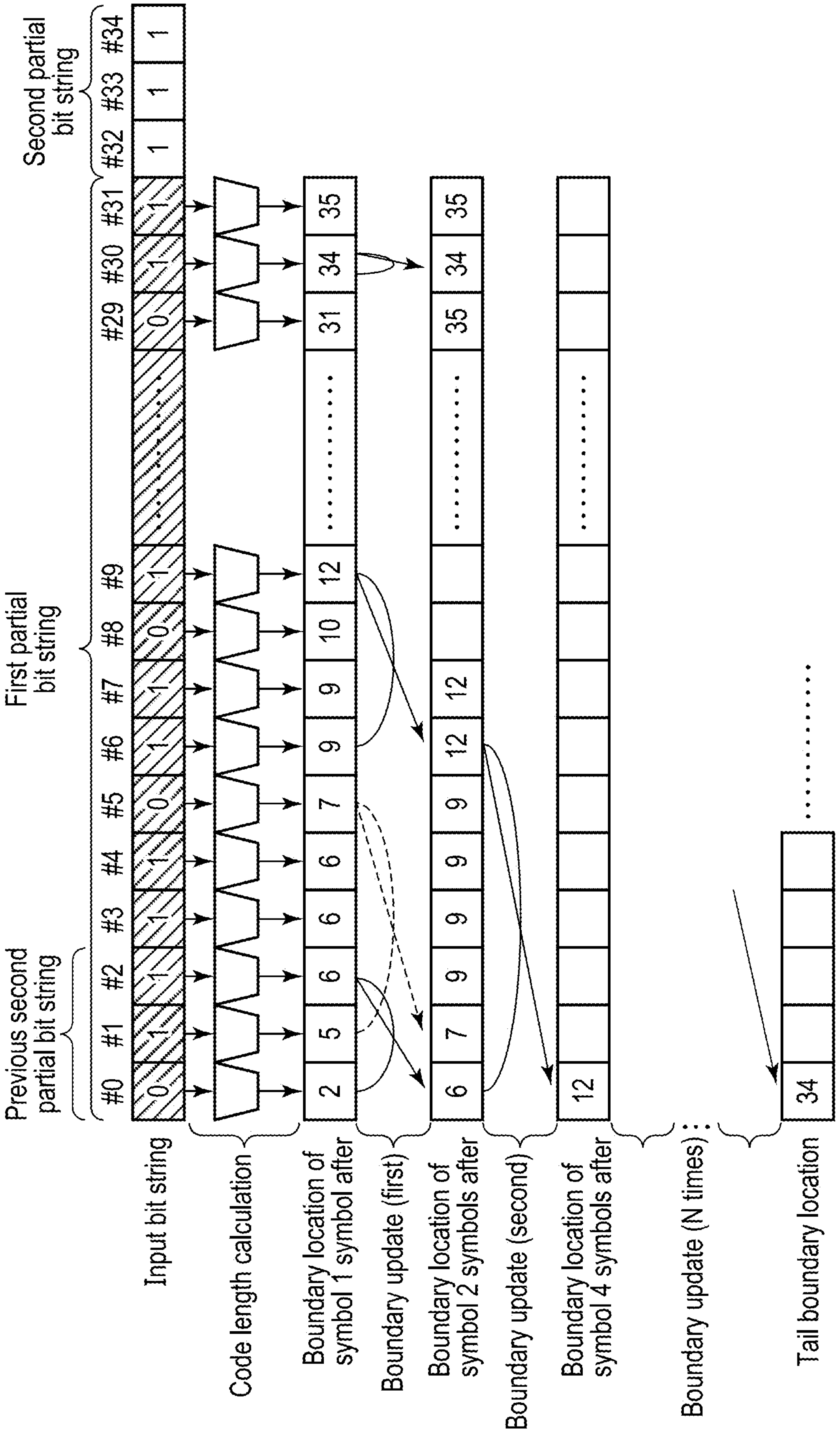
FIG. 8 is a diagram illustrating an extraction process for extracting symbols from a compressed stream in a comparative example.

First, the extraction process for extracting one or more symbols from a compressed stream in the comparative example will be described. FIG. 8 is a diagram illustrating the extraction process for extracting symbols from a compressed stream in the comparative example.

In the comparative example, 32 bits of bit #0 to bit #31 are a first partial bit string. Each bit of the first partial bit string is stored in an input bit string register. FIG. 8 also illustrates several bits #32 to #34 for explanation. Here, the bits from bit #32 to bit #34 are referred to as a second partial bit string.

In FIG. 8, in the input bit string, bit #0 stores "0", bit #1 stores "1", bit #2 stores "1", bit #3 stores "1", bit #4 stores "1", bit #5 stores "0", bit #6 stores "1", bit #7 stores "1", bit #8 stores "0", bit #9 stores "1", . . . , bit #29 stores "0", bit #30 stores "1", and bit #31 stores "1".

A code length calculation circuit calculates code lengths, assuming that respective bits of the input bit string register are starting locations. The code length calculation circuit calculates the code lengths, assuming that the respective bits are starts of symbols (target symbols).

Based on the calculated code lengths, the code length calculation circuit calculates boundary locations of symbols that are one symbol after the respective target symbols, and stores the calculated boundary locations in a register.

For example, a result of the calculation is follows: the boundary location of the symbol that is one symbol after the symbol starting with bit #0 is "2"; the boundary location of the symbol that is one symbol after the symbol starting with bit #1 is "5"; the boundary location of the symbol that is one symbol after the symbol starting with bit #2 is "6"; the boundary location of the symbol that is one symbol after the symbol starting with bit #3 is "6"; the boundary location of the symbol that is one symbol after the symbol starting with bit #4 is "6"; the boundary location of the symbol that is one symbol after the symbol starting with bit #5 is "7"; the boundary location of the symbol that is one symbol after the symbol starting with bit #6 is "9"; the boundary location of the symbol that is one symbol after the symbol starting with bit #7 is "9"; the boundary location of the symbol that is one symbol after the symbol starting with bit #8 is "10"; and the boundary location of the symbol that is one symbol after starting with bit #9 is "12". In addition, the boundary location of the symbol that is one symbol after the symbol starting with bit #29 is "31", the boundary location of the symbol that is one symbol after the symbol starting with bit #30 is "34", and the boundary location of the symbol that is one symbol after the symbol starting with bit #31 is "35".

A boundary update circuit acquires boundary locations of symbols that are two symbols after by using the boundary locations of the symbols that are one symbol after. The boundary update circuit updates boundary location information by using boundary location information stored in a storage location that is identified based on the boundary location information of each of the symbols that are one symbol after.

The boundary location of the symbol that is one symbol after the symbol starting with bit #0 is "2", and the boundary location of the symbol that is one symbol after the symbol starting with bit #2 is "6". Thus, boundary location of a symbol that is two symbols after the symbol starting with bit #0 is "6". Boundary location information indicative of "6" is thereby stored in a storage location of a register that corresponds to bit #0. In addition, the boundary location of the symbol that is one symbol after the symbol starting with bit #1 is "5", and the boundary location of the symbol that is one symbol after the symbol starting with bit #5 is "7". Thus, boundary location of a symbol that is two symbols after the symbol starting with bit #1 is “7”. Boundary location information indicative of “7” is thereby stored in a storage location of the register that corresponds to bit #1.

Moreover, the boundary location of the symbol that is one symbol after the symbol starting with bit #6 is “9”, and the boundary location of the symbol that is one symbol after the symbol starting with bit #9 is “12”. Thus, a boundary location of a symbol that is two symbols after the symbol starting with bit #6 is “12”. Boundary location information indicative of “12” is thereby stored in a storage location of the register that corresponds to bit #6.

The above-described boundary updating is performed on each bit, and the boundary location information of the symbol that is two symbols after the symbol starting with each bit is thereby stored in the register. Note that when a boundary location of a symbol that is one symbol after is beyond the range of the first partial bit string, further updating is not performed. For example, the boundary location of the symbol that is one symbol after the symbol starting with bit #30 is “34”, but bit #34 is beyond the first partial bit string and included in the second partial bit string. Thus, as the boundary location information of the symbol that is two symbols after the symbol starting with bit #30, “34”, which is the same value as the boundary location information of the symbol that is one symbol after the symbol starting with bit #30, is stored in the corresponding storage location.

Then, a boundary update circuit acquires boundary locations of symbols that are four symbols after by using the boundary locations of the symbols that are two symbols after. The boundary update circuit updates boundary location information by using boundary location information stored in a storage location that is identified based on the boundary location information of each of the symbols that are two symbols after.

The boundary location of the symbol that is two symbols after the symbol starting with bit #0 is “6”, and the boundary location of the symbol that is two symbols after the symbol starting with bit #6 is “12”. Thus, a boundary location of a symbol that is four symbols after the symbol starting with bit #0 is “12”. Boundary location information indicative of “12” is thereby stored in a storage location of a register that corresponds to bit #0.

The above-described boundary updating is performed on each bit, and the boundary location information of the symbol that is four symbols after the symbol starting with each bit is thereby stored in the register.

In addition, when the above-described boundary updating is repeated N times, boundary location information of a symbol that is $2^N$ symbols after the symbol starting with each bit is stored in a register.

Figure 9:
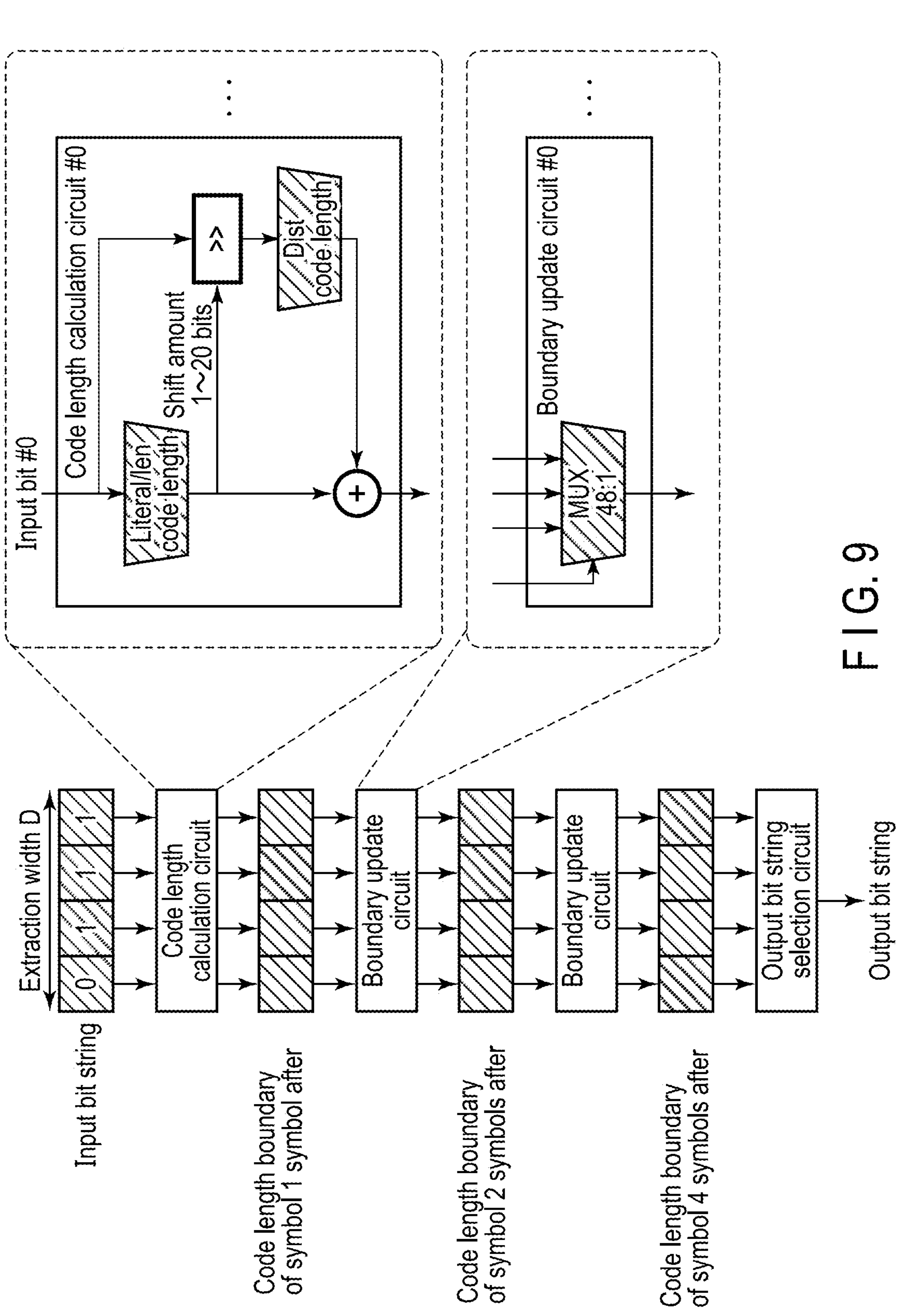
FIG. 9 is a diagram for explaining a detailed configuration example of extraction circuitry in the comparative example.

A detailed configuration example of extraction circuitry that includes the code length calculation circuit and the boundary update circuits in the comparative example will be described next. FIG. 9 is a diagram for explaining the detailed configuration example of the extraction circuitry in the comparative example.

FIG. 9 illustrates a case where an extraction width is four bits for simplification. A code length calculation circuit #0 illustrated in FIG. 9 calculates a code length, assuming that the initial bit #0 of an input bit string is the start of a symbol. The code length calculation circuit #0 includes a literal/match length code length calculation circuit, a shift circuit, a match distance code length calculation circuit, and an adding circuit.

When the type of a symbol is a literal symbol, the literal/match length code length calculation circuit calculates the code length of the literal symbol. In addition, when the type of the symbol is a match symbol, the literal/match length code length calculation circuit calculates only the code length of a portion that corresponds to a match length symbol of the match symbol.

When the type of the symbol is a match symbol, the shift circuit shifts the input bit string by the calculated code length of the portion that corresponds to the match length symbol.

The match distance code length calculation circuit calculates the code length of a portion that corresponds to a match distance symbol of the match symbol.

In addition, the adding circuit calculates the code length of the match symbol by adding the code length of the match distance symbol calculated by the match distance code length calculation circuit and the code length of the match length symbol.

In this manner, the code length calculation circuit #0 calculates either the code length of the literal symbol whose starting location is bit #0 or the code length of the match symbol whose starting location is bit #0. In addition, the code length calculation circuit includes code length calculation circuits that regard the other bits as starting locations, respectively. That is, the code length calculation circuit includes the code length calculation circuit #0 corresponding to bit #0, a code length calculation circuit #1 corresponding to bit #1, a code length calculation circuit #2 corresponding to bit #2, and a code length calculation circuit #3 corresponding to bit #3.

A boundary update circuit #0 calculates boundary location information of a symbol that follows the symbol starting with bit #0. The boundary update circuit #0 includes a multiplexer. The multiplexer of the boundary update circuit #0 acquires boundary location information of a symbol that is two symbols after by referring to boundary location information of each of symbols that are one symbol after. The boundary update circuit #0 outputs the acquired boundary location information of the symbol that is two symbols after.

In this manner, the boundary update circuit #0 updates the boundary location information of the symbol that follows the symbol starting with bit #0. In addition, the boundary update circuit further includes other boundary update circuits each of which updates boundary location information of a symbol that follows a symbol starting with each of the other bits. That is, the boundary update circuit further includes a boundary update circuit #1 which updates boundary location information of a symbol following a symbol starting with bit #1, a boundary update circuit #2 which updates boundary location information of a symbol following a symbol starting with bit #2, and a boundary update circuit #3 which updates boundary location information of a symbol following a symbol starting with bit #3.

Figure 10:
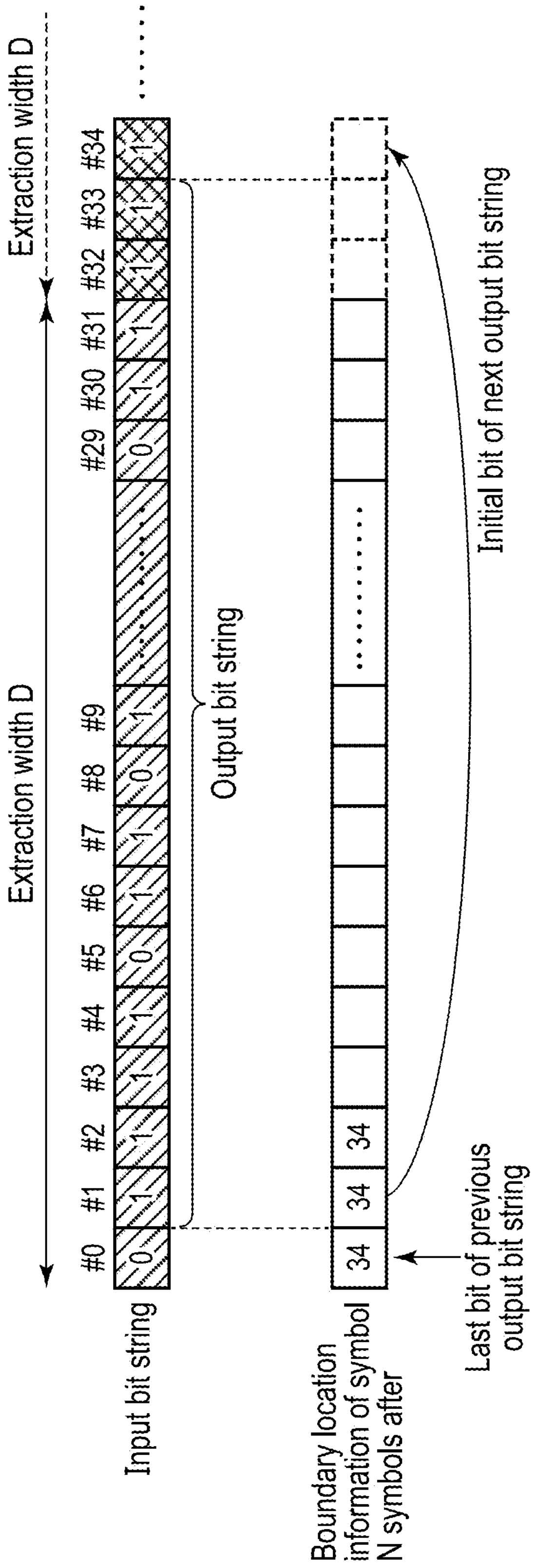
FIG. 10 is a diagram illustrating boundary location information of each of symbols that is $2^N$ symbols after and an output bit string generated through the extraction process in the comparative example.

An output bit string output in the comparative example will be described. FIG. 10 is a diagram illustrating boundary location information of each symbol that is $2^N$ symbols after and the output bit string generated through the extraction process in the comparative example.

FIG. 10 illustrates the boundary location information of each symbol that is $2^N$ symbols after that is acquired through an N-th time of boundary updating.

Here, in a case where the last bit of an output bit string output in the previous cycle is bit #0, the initial bit of a current output bit string is bit #1. Boundary location information of a symbol that is $2^N$ symbols after a symbol starting with bit #1 is “34”. Thus, the initial bit of a bit string output in the next cycle is bit #34.

Thus, the current output bit string is 33 bits of bit #1 to bit #33.

In the extraction circuitry of the comparative example, in particular, since the code length calculation circuit requires the shift circuit and the adding circuit, the circuit scale increases. Moreover, the code length calculation circuit includes multiple circuits that correspond to the bits included in the extraction range, respectively. Therefore, the influence of the increased circuit scale becomes greater by the number of bits included in the extraction range. The embodiment that reduces the circuit scale necessary for extraction from a compressed stream will be described.

Figure 11:
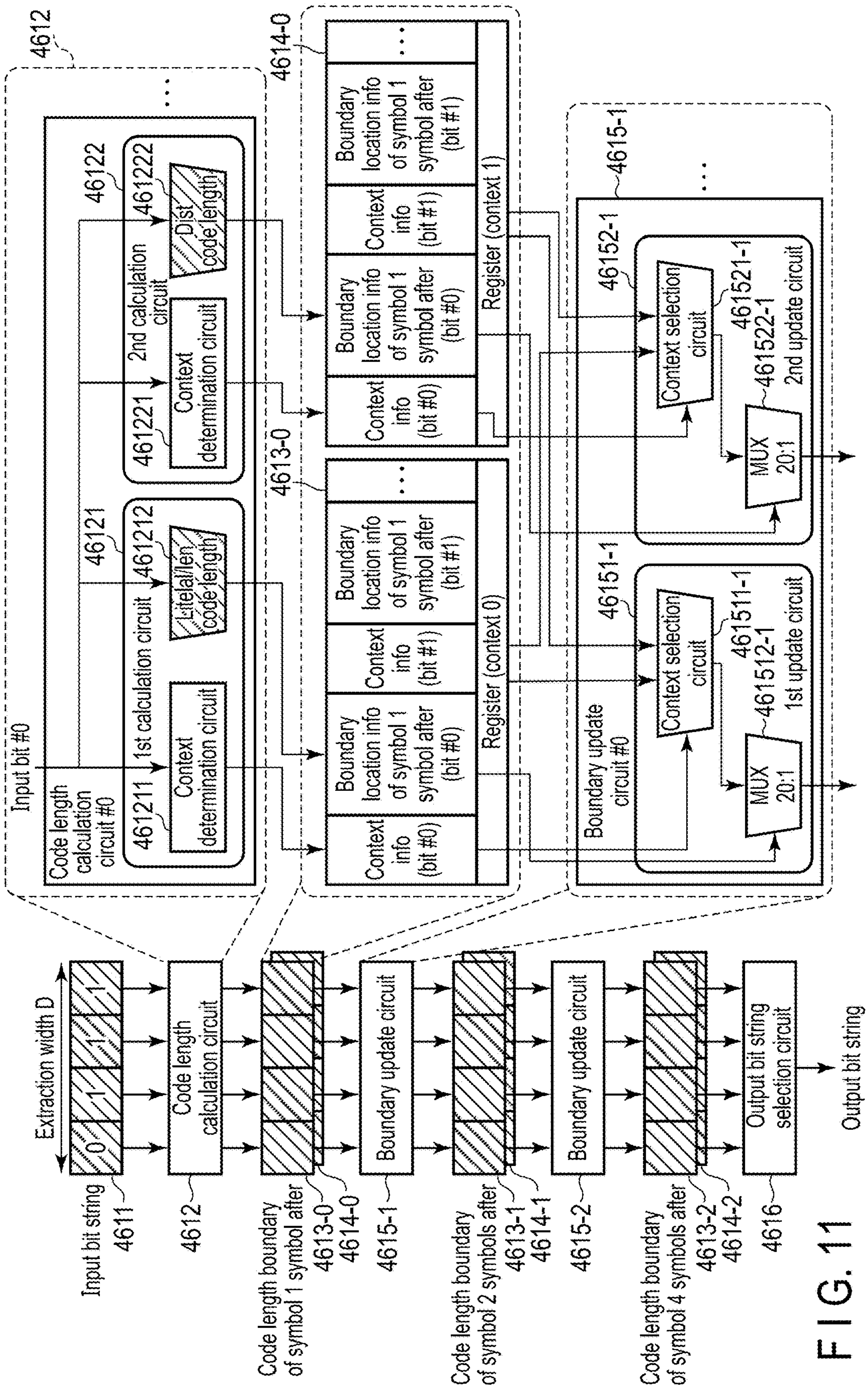
FIG. 11 is a diagram for explaining a detailed configuration example of the extraction circuitry included in the decoding device according to the embodiment.

FIG. 11 is a diagram for explaining a detailed configuration example of the extraction circuitry 461 in the decoding device 46 according to the embodiment.

FIG. 11 illustrates a case where an extraction width is four bits as in the case of FIG. 9. The description here focuses on structural elements corresponding to bit #0 as in the case of FIG. 9, while the other structural elements corresponding to the other bits may have the same configurations as that of the structural elements corresponding to bit #0. The code length calculation circuit #0 illustrated in FIG. 11 is a circuit which calculates a code length, assuming that the initial bit #0 of an input bit string is the start of a symbol.

The code length calculation circuit #0 includes a first calculation circuit 46121 and a second calculation circuit 46122.

The first calculation circuit 46121 calculates a code length, assuming that the first encoding scheme is used for the symbol starting with bit #0. That is, the first calculation circuit 46121 calculates the code length, assuming that the symbol starting with bit #0 is a literal symbol or a match length symbol. The first calculation circuit 46121 includes a context determination circuit 461211 and a literal/match length code length calculation circuit 461212.

The context determination circuit 461211 is a circuit which determines context information of a symbol that is one symbol after a symbol whose code length is being calculated. When the symbol whose code length is being calculated is a literal symbol, the context determination circuit 461211 determines that the first encoding scheme is used for the symbol that is one symbol after. In addition, when the symbol whose code length is being calculated is a match length symbol, the context determination circuit 461211 determines that the second encoding scheme is used for the symbol that is one symbol after. For example, the context determination circuit 461211 sets the context information to "0" when the first encoding scheme is used. In contrast, the context determination circuit 461211 sets the context information to "1" when the second encoding scheme is used. This is based on the fact that a symbol following a literal symbol is a literal symbol or a match length symbol and that a symbol following a match length symbol is a match distance symbol.

The literal/match length code length calculation circuit 461212 is a circuit which calculates a code length, assuming the symbol starting with bit #0 (target symbol). At this time, the literal/match length code length calculation circuit 461212 calculates the code length, assuming that the first encoding scheme is used for the target symbol. In other words, the literal/match length code length calculation circuit 461212 calculates the code length, assuming that the symbol starting with bit #0 is either a literal symbol or a match length symbol.

The first calculation circuit 46121 generates boundary location information of the symbol that is one symbol after the target symbol on the basis of the calculated code length. The first calculation circuit 46121 generates the boundary location information of the symbol that is one symbol after the target symbol by using the starting location of the target symbol and the code length of the target symbol. The first calculation circuit 46121 stores the generated boundary location information of the symbol that is one symbol after the target symbol and the context information, in a storage location of the first register 4613-0 that corresponds to bit #0.

The second calculation circuit 46122 calculates a code length, assuming the second encoding scheme is used for the symbol starting with bit #0 (target symbol). That is, the second calculation circuit 46122 calculates the code length, assuming that the symbol starting with bit #0 is a match distance symbol. The second calculation circuit 46122 includes a context determination circuit 461221 and a match distance code length calculation circuit 461222.

The context determination circuit 461221 is a circuit which determines context information of a symbol that is one symbol after the target symbol. The context determination circuit 461221 determines that the first encoding scheme is used for the symbol that is one symbol after the target symbol. For example, the context determination circuit 461221 sets the context information to "0". This is because a symbol following a match distance symbol is a literal symbol or a match length symbol. The literal symbol and the match length symbol are both data encoded by the first encoding scheme.

The match distance code length calculation circuit 461222 is a circuit which calculates a code length. The match distance code length calculation circuit 461222 calculates the code length, assuming that the symbol staring with bit #0 is a match distance symbol.

The second calculation circuit 46122 generates boundary location information of the symbol that is one symbol after the target symbol on the basis of the calculated code length. The second calculation circuit 46122 generates the boundary location information of the symbol that is one symbol after the target symbol by using the starting location of the target symbol and the code length of the target symbol. The second calculation circuit 46122 stores the generated boundary location information of the symbol that is one symbol after the target symbol and the context information, in the storage location of the second register 4614-0 that corresponds to bit #0.

For each of the other bits of the input bit string as well, context information and boundary location information of a symbol that is one symbol after is similarly generated and stored in storage locations of the first register 4613-0 and the second register 4614-0.

The boundary update circuit 4615-1 is a circuit which acquires boundary location information of a symbol that is two symbols after a symbol starting with each bit, based on the boundary location information of the symbol that is one symbol after the symbol starting with each bit. The boundary update circuit 4615-1 includes the first update circuit 46151-1 or the second update circuit 46152-1.

The first update circuit 46151-1 acquires the boundary location information and context information of a symbol that is two symbols after to be stored in the first register 4613-1, based on the boundary location information of a symbol that is one symbol after stored in the first register 4613-0. The first update circuit 46151-1 includes a context selection circuit 461511-1 and a multiplexer (MUX) 461512-1.

The context selection circuit 461511-1 is a circuit which selects the first register 4613-0 or the second register 4614-0, based on the context information. The context selection circuit 461511-1 acquires the context information corresponding to bit #0 from the first register 4613-0. When the acquired context information is "0", the context selection circuit 461511-1 selects the first register 4613-0. In contrast, when the acquired context information is "1", the context selection circuit 461511-1 selects the second register 4614-0.

The multiplexer 461512-1 is a circuit which selects a storage location of the first register 4613-0 or a storage location of the second register 4614-0, based on the boundary location information of the symbol that is one symbol after. From a storage location that is included in the register selected by the context selection circuit 461511-1 and corresponds to the boundary location information of the symbol that is one symbol after, the multiplexer 461512-1 acquires context information and boundary location information.

With the context selection circuit 461511-1 and the multiplexer 461512-1, the first update circuit 46151-1 selects the storage location of the register and acquires the boundary location information and context information of the symbol that is two symbols after. Then, the first update circuit 46151-1 stores the acquired boundary location information and context information of the symbol that is two symbols after, in a storage location of the first register 4613-1 that corresponds to bit #0.

The second update circuit 46152-1 acquires the boundary location information and context information of the symbol that is two symbols after to be stored in the second register 4614-1, based on the boundary location information of the symbol that is one symbol after stored in the second register 4614-0. The second update circuit 46152-1 includes a context selection circuit 461521-1 and a multiplexer (MUX) 461522-1.

The context selection circuit 461521-1 is a circuit which selects the first register 4613-0 or the second register 4614-0, based on the context information. The context selection circuit 461521-1 acquires the context information corresponding to bit #0 from the second register 4614-0. When the acquired context information is "0", the context selection circuit 461521-1 selects the first register 4613-0. In contrast, when the acquired context information is "1", the context selection circuit 461521-1 selects the second register 4614-0.

The multiplexer 461522-1 is a circuit which selects a storage location of the first register 4613-0 or a storage location of the second register 4614-0, based on the boundary location information of the symbol that is one symbol after. From a storage location that is included in the register selected by the context selection circuit 461521-1 and corresponds to the boundary location information of the symbol that is one symbol after, the multiplexer 461522-1 acquires context information and boundary location information.

With the context selection circuit 461521-1 and the multiplexer 461522-1, the second update circuit 46152-1 selects the storage location of the register and acquires the boundary location information and context information of the symbol that is two symbols after. Then, the second update circuit 46152-1 stores the acquired boundary location information and context information of the symbol that is two symbols after, in a storage location of the second register 4614-1 that corresponds to bit #0.

Similarly, the boundary update circuit 4615-2 acquires boundary location information and context information of each symbol that is four symbols after, based on the boundary location information and the context information of each symbol that is two symbols after, which are stored in the first register 4613-1 and the second register 4614-2. The boundary update circuit 4615-2 stores the acquired boundary location information and context information of each symbol that is four symbols after, in the first register 4613-2 and the second register 4614-2.

Then, the output bit string selection circuit 4616 selects an output bit string, based on the boundary location information and the context information of each symbol that is four symbols after, which are stored in the first register 4613-2 and the second register 4614-2.

Figure 12:
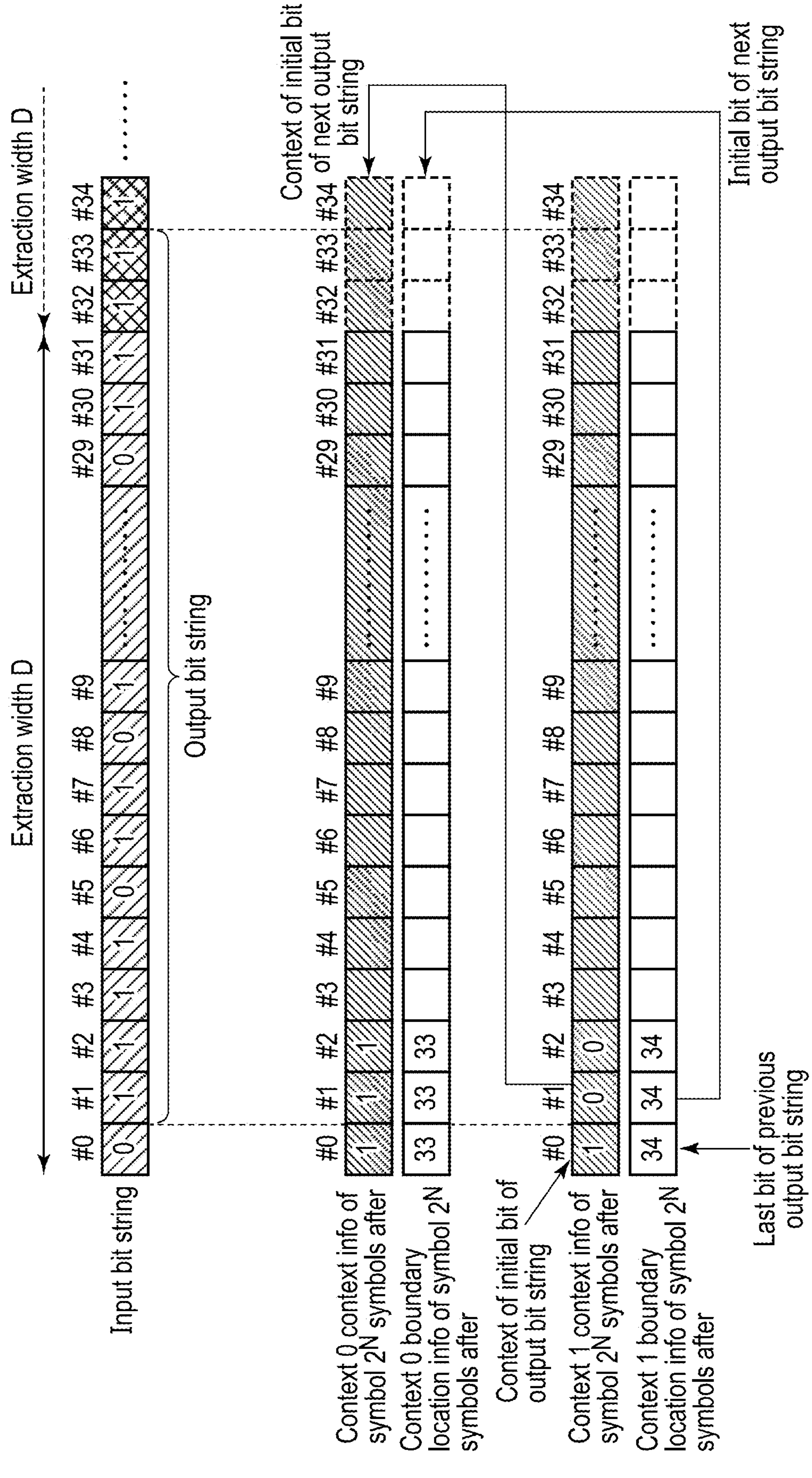
FIG. 12 is a diagram illustrating boundary location information of each of symbol that is $2^N$ symbols after and an output bit string generated through an extraction process executed by the decoding device according to the embodiment.

The output bit string output by the output bit string selection circuit 4616 will be described. FIG. 12 is a diagram illustrating boundary location information of each symbol that is $2^N$ symbols after and the output bit string, which are generated through the extraction process performed by the decoding device 46 according to the embodiment. FIG. 12 illustrates a case where the extraction width D is 32.

FIG. 12 illustrates two types of boundary location information and context information of each symbol that is $2^N$ symbols after, which are generated through an Nth time of boundary updating. N is an integer greater than or equal to one. The context information and boundary location information of each symbol that is $2^N$ symbols after, which corresponds to context 0, are stored in, for example, the first register 4613-N. To be specific, with respect to context 0, the boundary location information of the symbol that is $2^N$ symbols after the symbol starting with bit #0 is "33", and the context information of the symbol that is $2^N$ symbols after the symbol starting with bit #0 is "1". With respect to context 0, the boundary location information of the symbol that is $2^N$ symbols after the symbol starting with bit #1 is "33", and the context information of the symbol that is $2^N$ symbols after the symbol starting with bit #1 is "1". With respect to context 0, the boundary location information of the symbol that is $2^N$ symbols after the symbol starting with bit #2 is "33", and the context information of the symbol that is $2^N$ symbols after the symbol starting with bit #2 is "1".

The context information and boundary location information of each symbol that is $2^N$ symbols after, which correspond to context 1, are stored in, for example, the second register 4614-N. To be specific, with respect to context 1, the boundary location information of the symbol that is $2^N$ symbols after the symbol starting with bit #0 is "34", and the context information of the symbol that is $2^N$ symbols after the symbol starting with bit #0 is "1". With respect to context 1, the boundary location information of the symbol that is $2^N$ symbols after the symbol starting with bit #1 is "34", and the context information of the symbol that is $2^N$ symbols after the symbol starting with bit #1 is "0". With respect to context 1, the boundary location information of the symbol that is $2^N$ symbols after the symbol starting with bit #2 is "34", and the context information of the symbol that is $2^N$ symbols after the symbol starting with bit #2 is "0".

It is here assumed that the context information corresponding to the initial bit of an output bit string output in the previous cycle indicates "1" and the last bit is bit #0. In this case, the initial bit of a current output bit string corresponds to bit #1 of context 1. That is, the current output bit string is extracted with the extraction range that starts with the bit following the bit at the end of the bit string output in the previous cycle.

At this time, the boundary location information of the symbol that is $2^N$ symbols after the symbol starting with bit #1 of context 1 is "34". Thus, the current output bit string is 33 bits of bit #1 to bit #33 of context 1.

In addition, the context information of bit #1 of context 1 is "0". Thus, the initial bit of a bit string output in the next cycle is bit #34 of context 0.

Figure 13:
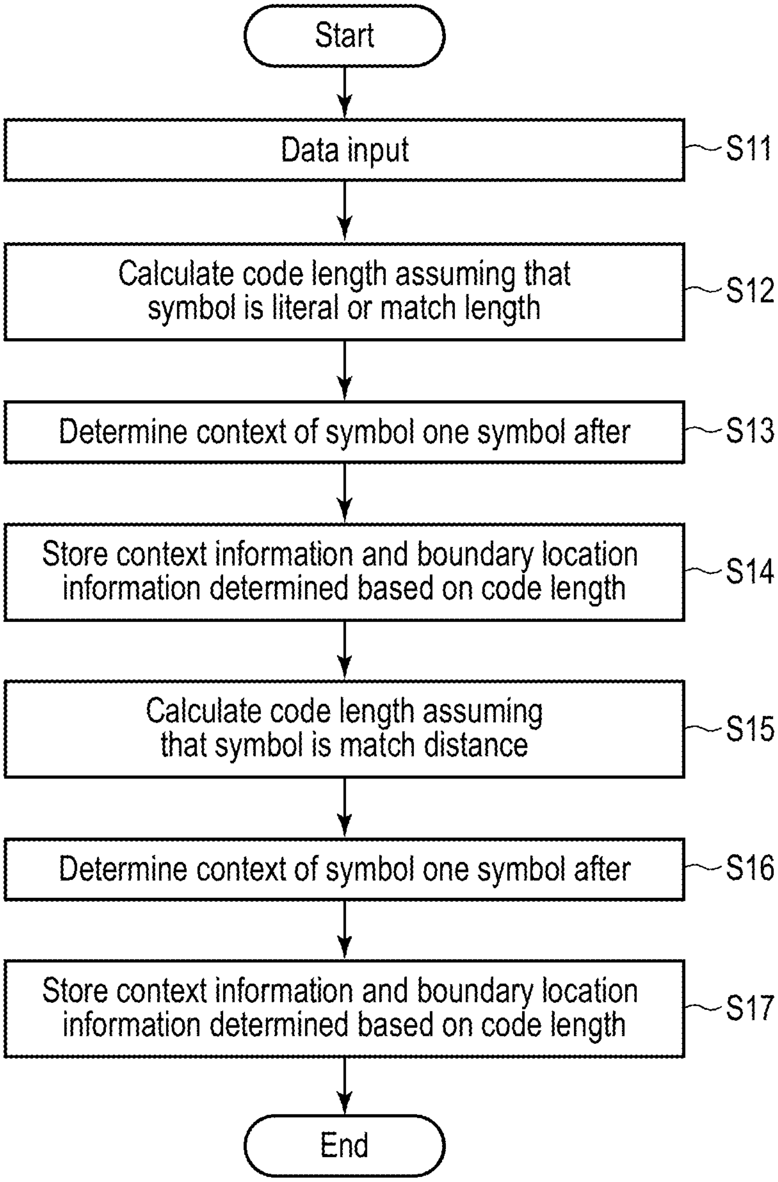
FIG. 13 is a flowchart illustrating an example of the procedure of a code length calculation process of the extraction process executed by the decoding device according to the embodiment.

A code length calculation process will be described next. FIG. 13 is a flowchart illustrating the procedure of the code length calculation process of the extraction process that is performed by the decoding device 46 according to the embodiment.

First, data is input to the extraction circuitry 461 of the decoding device 46 (step S11). The input data is stored in, for example, the input bit string register 4611.

The first calculation circuit 46121 of the code length calculation circuit 4612 assumes that each bit of the input bit string is a starting location of a symbol and that the symbol is a literal symbol or a match length symbol, and calculates the code length of the symbol (step S12). That is, the first calculation circuit 46121 calculates the code length, assuming that each bit is the starting location of the symbol and the symbol is encoded by the first encoding scheme.

The context determination circuit 461211 of the first calculation circuit 46121 determines, for each bit, the context of a symbol that is one symbol after (step S13). That is, the context determination circuit 461211 determines context information of the symbol following the symbol whose code length has been calculated in step S12. When the symbol whose code length has been calculated in step S12 is a literal symbol, the context determination circuit 461211 determines that the context information is "0", which indicates that the following symbol is a literal symbol or a match length symbol. In contrast, when the symbol whose code length has been calculated in step S12 is a match length symbol, the context determination circuit 461211 determines that the context information is "1", which indicates that the following symbol is a match distance symbol.

The first calculation circuit 46121 stores, in the first register 4613-0, the context information determined in step S13 and boundary location information that is determined based on the code length calculated in step S12 (step S14).

The second calculation circuit 46122 of the code length calculation circuit 4612 assumes that each bit of the input bit string is a starting location of a symbol and that the symbol is a match distance symbol, and calculates the code length of the symbol (step S15). That is, the second calculation circuit 46122 calculates the code length, assuming that each bit is the starting location of the symbol and the symbol is encoded by the second encoding scheme.

The context determination circuit 461221 of the second calculation circuit 46122 determines, for each bit, the context of a symbol that is one symbol after (step S16). That is, the context determination circuit 461221 determines context information of the symbol following the symbol whose code length has been calculated in step S15. The context determination circuit 461221 determines that the context information is "0", which indicates that the following symbol is a literal symbol or a match length symbol.

The second calculation circuit 46122 stores, in the second register 4614-0, the context information determined in step S16 and boundary location information that is determined based on the code length calculated in step S15 (step S17).

Thus, the extraction circuitry 461 assumes that each bit in the extraction range of the input bit string is the starting location of the symbol (target symbol), calculates the boundary location information and context information of the symbol that is one symbol after on the basis of the assumption that the target symbol is encoded by the first encoding scheme, and calculates the boundary location information and context information of the symbol that is one symbol after on the basis of the assumption that the target symbol is encoded by the second encoding scheme. Then, the calculated boundary location information and context information are stored in the first register 4613-0 and the second register 4614-0.

Figure 14:
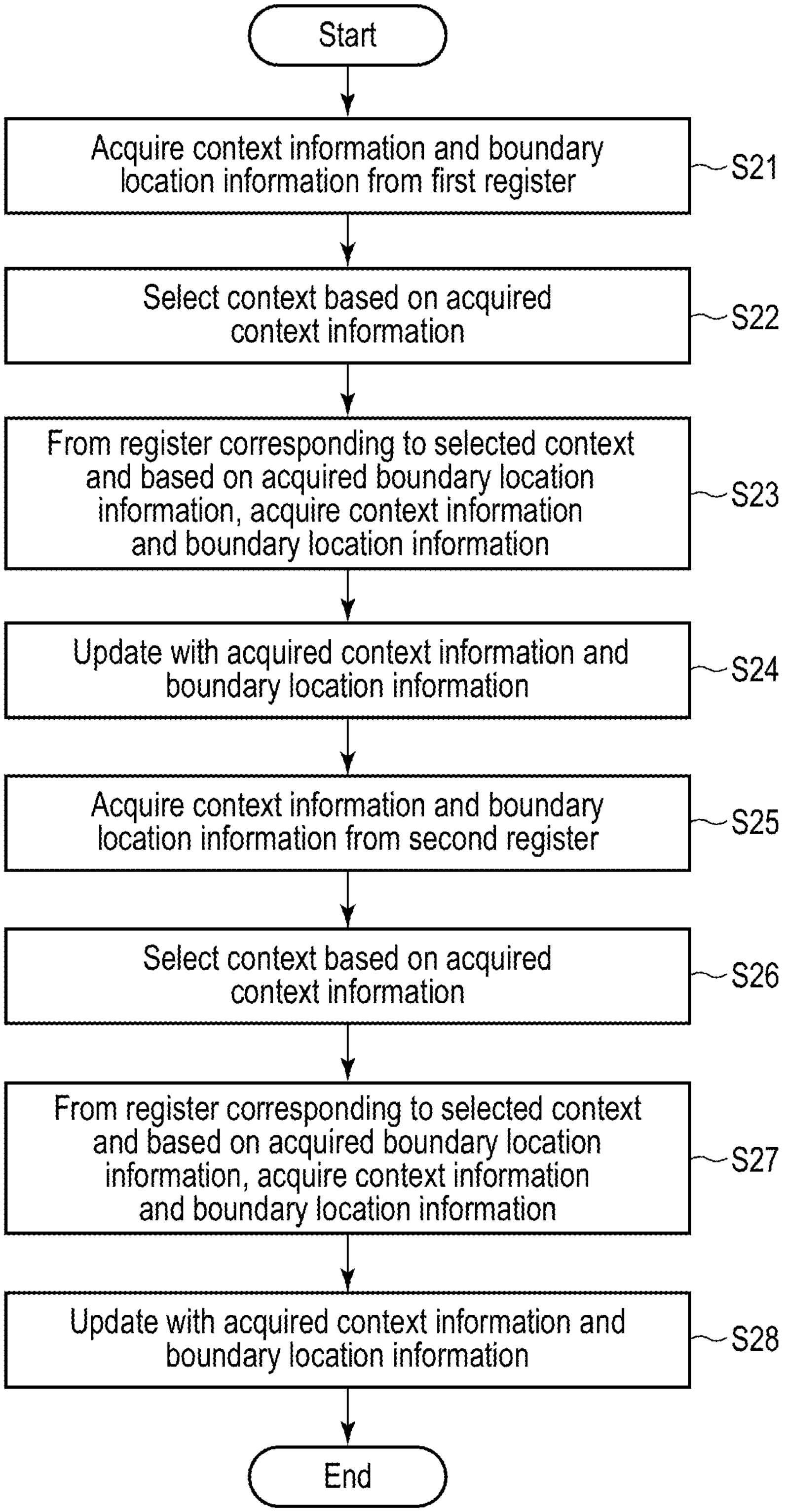
FIG. 14 is a flowchart illustrating an example of the procedure of a boundary updating process of the extraction process executed by the decoding device according to the embodiment.

A boundary updating process of the extraction process will be described next. FIG. 14 is a flowchart illustrating the procedure of the boundary updating process of the extraction process that is performed by the decoding device 46 according to the embodiment.

A first update circuit 46151 of a boundary update circuit 4615 acquires context information and boundary location information from a first register 4613 (step S21). For example, each of first update circuits 46151 acquires context information and boundary location information that correspond to each of bits included in an extraction width, from each of the storage locations of the first register 4613.

A context selection circuit 461511 of the first update circuit 46151 selects context, based on the context information acquired in step S21 (step S22).

The first update circuit 46151 acquires context information and boundary location information stored in a storage location that is included in the register corresponding to the context selected in step S22 and that corresponds to the boundary location information acquired in step S21 (step S23). When the context selected in step S22 is context 0, the first update circuit 46151 acquires context information and boundary location information from the first register 4613. When the context selected in step S22 is context 1, the first update circuit 46151 acquires context information and boundary location information from a second register 4614.

The first update circuit 46151 updates the first register 4613 by using the context information and the boundary location information acquired in step S23 (step S24).

A second update circuit 46152 of the boundary update circuit 4615 acquires context information and boundary location information from the second register 4614 (step S25). For example, each of second update circuits 46152 acquires context information and boundary location information that correspond to each of the bits included in the extraction width, from each of the storage locations of the second register 4614.

A context selection circuit 461521 of the second update circuit 46152 selects context, based on the context information acquired in step S25 (step S26).

The second update circuit 46152 acquires context information and boundary location information stored in a storage location that is included in the register corresponding to the context selected in step S26 and that corresponds to the boundary location information acquired in step S25 (step S27). When the context selected in step S26 is context 0, the second update circuit 46152 acquires context information and boundary location information from the first register 4613. When the context selected in step S26 is context 1, the second update circuit 46152 acquires context information and boundary location information from the second register 4614.

The second update circuit 46152 updates the second register 4614 by using the context information and the boundary location information acquired in step S27 (step S28).

The procedure from step S21 to step S24 and the procedure from step S25 to step S28 may be performed in parallel.

The extraction circuitry 461 can acquire boundary location information and context information of a symbol that follows a symbol starting with each bit of the extraction range by repeating the procedure described with reference to FIG. 14.

Thus, by performing the boundary updating process, the extraction circuitry 461 can acquire boundary location information and context information of each symbol that is two or more symbols after the symbol starting with each bit of the extraction range of the input bit string, based on the boundary location information and context information of each symbol that is one symbol after the symbol starting with each bit. When the boundary updating process is repeated N times, the extraction circuitry 461 can acquire boundary location information and context information of each symbol that is $2^N$ symbols after.

Figure 15:
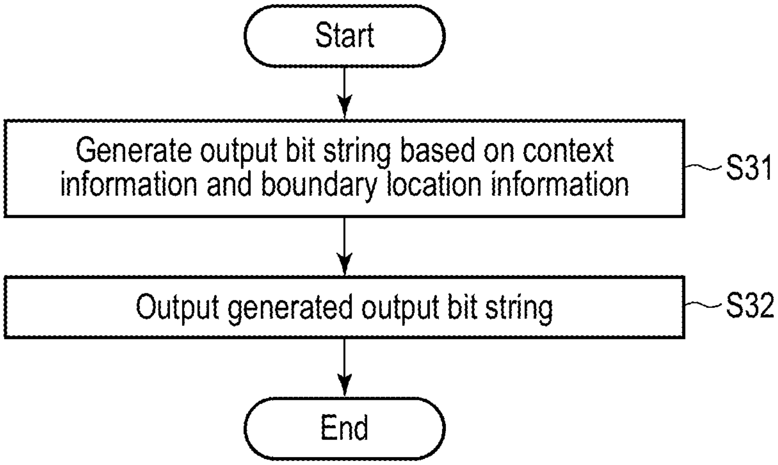
FIG. 15 is a flowchart illustrating an example of the procedure of an output bit string outputting process of the extraction process executed by the decoding device according to the embodiment.

An output bit string outputting process of the extraction process will be described next. FIG. 15 is a flowchart illustrating the procedure of the output bit string outputting process of the extraction process that is performed by the decoding device 46 according to the embodiment.

First, the output bit string selection circuit 4616 generates an output bit string, based on context information and boundary location information stored in the first register 4613 and the second register 4614 (step S31).

The output bit string selection circuit 4616 outputs the output bit string generated in step S31 (step S32).

The extraction circuitry 461 thereby generates the output bit string, based on the boundary location information and context information generated through the code length calculation process and the boundary updating process.

On the output bit string, for example, a decoding process is performed by the decoding circuitry 462.

As described above, the extraction circuitry 461 of the decoding device 46 according to the embodiment can acquire boundary location information and context information of a symbol that is $2^N$ symbols after without needing a shift circuit and an adding circuit.

In addition, the code length calculation circuit 4612 included in the extraction circuitry 461 of the decoding device 46 according to the present embodiment, does not need a shift circuit and an adding circuit, unlike the configuration example of the code length calculation circuit of the comparative example described with reference to FIG. 9. Moreover, the code length calculation circuit 4612 includes the structural elements that correspond to the number of bits included in the extraction range. Therefore, as the number of bits included in the extraction range increases, the code length calculation circuit 4612 of the present embodiment brings about a greater effect in reducing the circuit scale against the code length calculation circuit of the comparative example.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A decoding device configured to decode first data being input to the decoding device, the decoding device comprising:

extraction circuitry configured to extract one or more symbols from the first data; and decoding circuitry configured to perform a decoding process on the one or more symbols, the extraction circuitry comprising:

a first code length calculation circuit configured to calculate first code lengths of respective first symbols, assuming that bits of a first bit string are starting locations of the first symbols, respectively, and that the first symbols are encoded by a first encoding scheme, the bits of the first bit string being included in an extraction range of the first data;

a second code length calculation circuit configured to calculate second code lengths of respective second symbols, assuming that the bits of the first bit string are starting locations of the second symbols and that the second symbols are encoded by a second encoding scheme;

a first determination circuit configured to determine first context information indicating that each of third symbols is encoded by any one of the first encoding scheme and the second encoding scheme, the third symbols following the first symbols, respectively;

a second determination circuit configured to determine second context information indicating that each of fourth symbols is encoded by any one of the first encoding scheme and the second encoding scheme, the fourth symbols following the second symbols, respectively;

a first register configured to store the first context information, and first boundary location information that indicates an initial bit location of each of the third symbols and is determined based on the first code lengths;

a second register configured to store the second context information, and second boundary location information that indicates an initial bit location of each of the fourth symbols and is determined based on the second code lengths;

a first update circuit configured to:

acquire third context information and third boundary location information that correspond to fifth symbols, based on the first context information and the first boundary location information that are stored in the first register, the fifth symbols following the third symbols, respectively, the third boundary location information indicating an initial bit of each of the fifth symbols; and store the third context information and the third boundary location information in the first register; and a second update circuit configured to:

acquire fourth context information and fourth boundary location information that correspond to sixth symbols, based on the second context information and the second boundary location information that are stored in the second register, the sixth symbols following the fourth symbols, respectively, the fourth boundary location information indicating an initial bit of each of the sixth symbols; and store the fourth context information and the fourth boundary location information in the second register, the extraction circuitry further including an output circuit configured to:

extract one or more symbols from a bit string in the extraction range, based on pieces of context information and pieces of boundary location information that are stored in the first register and the second register; and output the one or more extracted symbols to the decoding circuitry, the decoding circuitry being configured to perform the decoding process on each of the one or more extracted symbols.

2. The decoding device according to claim 1, wherein the first update circuit is configured to acquire fifth context information and fifth boundary location information that correspond to seventh symbols, based on the third context information and the third boundary location information that are stored in the first register, the seventh symbols following the fifth symbols, respectively, the fifth boundary location information indicating an initial bit of each of the seventh symbols, the second update circuit is configured to acquire sixth context information and sixth boundary location information that correspond to eighth symbols, based on the fourth context information and the fourth boundary location information that are stored in the second register, the eighth symbols following the sixth symbols, respectively, the sixth boundary location information indicating an initial bit of each of the eighth symbols, the first update circuit is configured to repeat the acquiring process until boundary location information that corresponds to each symbol that is $2^N$ symbols after each of the first symbols is acquired, the second update circuit is configured to repeat the acquiring process until boundary location information that corresponds to each symbol that is $2^N$ symbols after each of the second symbols is acquired, and N is an integer greater than or equal to one.

3. The decoding device according to claim 1, wherein the first data is data encoded based on a Deflate standard, the first encoding scheme is a scheme by which a literal symbol or a match length symbol is encoded, and the second encoding scheme is a scheme by which a match distance symbol is encoded.

4. The decoding device according to claim 3, wherein the first determination circuit is configured to:

when one of the first symbols is a literal symbol, output the first context information corresponding to the first encoding scheme; and when one of the first symbols is a match length symbol, output the first context information corresponding to the second encoding scheme, and the second determination circuit is configured to output the second context information corresponding to the first encoding scheme.

5. The decoding device according to claim 1, wherein a second bit string includes bits of the extraction range that starts with a bit following a last bit of the one or more extracted symbols, among the first data, and the extraction circuitry is configured to, after extracting the one or more symbols, extract one or more symbols from the second bit string.

6. The decoding device according to claim 5, wherein the output circuit is configured to, based on context information and boundary location information of a symbol that is $\mathbf{2}^N$ symbols ahead:

determine a starting bit location of a next extraction range; and determine whether an initial symbol of the next extraction range is encoded by the first encoding scheme or the second encoding scheme; and N is an integer greater than or equal to one.

7. The decoding device according to claim 1, wherein the decoding process includes entropy decoding and dictionary-based decoding performed after the entropy decoding.

8. The decoding device according to claim 1, wherein the first data is generated by performing dictionary-based encoding on uncompressed data and performing entropy encoding on the uncompressed data on which the dictionary-based encoding has been performed.

9. The decoding device according to claim 1, wherein each of the first symbols is a literal symbol or a match length symbol, the first code lengths are lengths of code words that are obtained by performing entropy encoding on the first symbols, each of the second symbols is a match distance symbol, and the second code lengths are lengths of code words that are obtained by performing entropy encoding on the second symbols.

10. The decoding device according to claim 1, wherein the first symbols include an i-th symbol that starts with an i-th bit of the first bit string, the first code length calculation circuit is configured to:

determine a first bit location as the initial bit location of the third symbol that follows the i-th symbol, the first bit location being obtained by adding the first code length of the i-th symbol to the i-th bit; and store, in the first register, the first boundary location information that corresponds to the i-th bit and indicates the first bit location, and i is any integer between one and a bit length of the first bit string inclusive.

11. The decoding device according to claim 10, wherein the first update circuit is configured to acquire, from (A) first combinations each including the first context information and the first boundary location information that correspond to each of the bits and (B) second combinations each including the second context information and the second boundary location information that correspond to each of the bits, a third combination including the third context information and the third boundary location information that corresponds to the i-th bit, based on a combination including the first context information and the first boundary location information that correspond to the i-th bit.

12. The decoding device according to claim 11, wherein the first update circuit is configured to:

when the first context information corresponding to the i-th bit indicates that the third symbol following the i-th symbol is encoded by the first encoding scheme, acquire the third combination from the first combinations, based on the first boundary location information corresponding to the i-th bit; and when the first context information corresponding to the i-th bit indicates that the third symbol following the i-th symbol is encoded by the second encoding scheme, acquire the third combination from the second combinations, based on the first boundary location information corresponding to the i-th bit.

13. The decoding device according to claim 11, wherein the first update circuit is configured to store the third combination in the first register.

14. The decoding device according to claim 10, wherein the second symbols include a j-th symbol that starts with a j-th bit of the first bit string, the second code length calculation circuit is configured to:

determine a second bit location as the initial bit location of the fourth symbol that follows the j-th symbol, the second bit location being obtained by adding the second code length of the j-th symbol to the j-th bit; and store, in the second register, the second boundary location information that corresponds to the j-th bit and indicates the second bit location, and j is any integer between one and the bit length of the first bit string inclusive.

15. The decoding device according to claim 14, wherein the second update circuit is configured to acquire, from (A) first combinations each including the first context information and the first boundary location information that correspond to each of the bits and (B) second combinations each including the second context information and the second boundary location information that correspond to each of the bits, a fourth combination including the fourth context information and the fourth boundary location information that correspond to the j-th bit, based on a combination including the second context information and the second boundary location information that correspond to the j-th bit.

16. The decoding device according to claim 15, wherein the first update circuit is configured to:

when the second context information corresponding to the j-th bit indicates that the fourth symbol following the j-th symbol is encoded by the first encoding scheme, acquire the fourth combination from the first combinations, based on the second boundary location information corresponding to the j-th bit; and when the second context information corresponding to the j-th bit indicates that the fourth symbol following the j-th symbol is encoded by the second encoding scheme, acquire the fourth combination from the second combinations, based on the second boundary location information corresponding to the j-th bit.

17. The decoding device according to claim 15, wherein the second update circuit is configured to store the fourth combination in the second register.

18. A memory system connectable to a host, the memory system comprising:

a nonvolatile memory; and a memory controller including the decoding device according to claim 1 and configured to read data from the nonvolatile memory, the data read from the nonvolatile memory being input to the decoding device as the first data, the memory controller being configured to transmit, to the host, data on which the decoding process is performed by the decoding device.

* * * * *